United States Patent [19]
Meli et al.

[11] Patent Number: 5,701,194
[45] Date of Patent: Dec. 23, 1997

[54] AMPLIFIED TELECOMMUNICATION SYSTEM FOR WAVELENGTH-DIVISION MULTIPLEXING TRANSMISSIONS CAPABLE OF LIMITING VARIATIONS IN THE OUTPUT POWER

[75] Inventors: Fausto Meli, Piacenza; Stefano Piciaccia, Milan, both of Italy

[73] Assignee: Pirelli Cavi S.p.A., Italy

[21] Appl. No.: 618,502

[22] Filed: Mar. 19, 1996

Related U.S. Application Data

[63] Continuation of Ser. No. 506,088, Jul. 24, 1995, abandoned.

[30] Foreign Application Priority Data

| Jul. 14, 1994 | [IT] | Italy | MI94A1535 |
| Jul. 25, 1994 | [IT] | Italy | MI94A1574 |

[51] Int. Cl.⁶ ............................................. H01S 3/00
[52] U.S. Cl. ............................. 359/341; 359/124
[58] Field of Search ............................. 359/341, 124

[56] References Cited

U.S. PATENT DOCUMENTS

| 5,050,949 | 9/1991 | DiGiovanni et al. | 359/341 |
| 5,280,383 | 1/1994 | Federici et al. | 359/341 |
| 5,406,411 | 4/1995 | Button et al. | 359/341 |
| 5,430,577 | 7/1995 | Hügenell | 359/848 |
| 5,455,710 | 10/1995 | Takeda | 359/341 |
| 5,506,723 | 4/1996 | Junginger | 359/341 |

*Primary Examiner*—Mark Hellner
*Attorney, Agent, or Firm*—Brooks Haidt Haffner &Delahunty

[57] ABSTRACT

An optical telecommunication system includes means for generating optical signals of different wavelengths, an optical-fibre line with amplifying means, a pre-amplifer, and receiving means. The the pre-amplifier comprises an optical waveguide doped with a rare earth material, differential-attenuation means located at a first position along the doped waveguide and capable of causing an attenuation in the signal band which is greater than the attenuation caused at the pumping wavelength, and filtering means located at a second position and adapted to attenuate by a value higher than a predetermined minimum, the spontaneous emission in a wavelength band contiguous with the signal band.

The position and attenuation of the differential-attenuation means and filtering means and the wavelength band are selected in a functional relation with respect to each other in order to limit the output power variations from the pre-amplifier.

67 Claims, 10 Drawing Sheets

AMPLIFIED TELECOMMUNICATION SYSTEM FOR WAVELENGTH-DIVISION MULTIPLEXING TRANSMISSIONS CAPABLE OF LIMITING VARIATIONS IN THE OUTPUT POWER

This application is a continuation of application Ser. No. 08/506,088, filed Jul. 24, 1995 now abandoned.

FIELD OF THE INVENTION

The present invention relates to an optical telecommunication system and an optical amplifier to be used in a telecommunication system. It particularly refers to a telecommunication system and amplifier adapted to a transmission of the wavelength-division multiplexing type or "WDM transmission". In a WDM transmission several channels, or transmission signals, independent of one another, are sent over the same line, usually consisting of an optical fibre, by optical wavelength multiplexing. The transmitted channels may be either digital or analog and are distinguished from each other because each of them is associated with a specific wavelength.

In order to enable transmission over distances longer than some hundred kilometers, the maximum distances that a passive fibre can reach, it is necessary to remedy the signal attenuation by the use of one or more optical amplifiers interposed along the line.

In U.S. patent application Ser. No. 08/367,719, filed in the name of the assignee of this application, it is described a transmitting line including optical amplifiers having a doped fibre and connected in cascade. The line is particularly adapted for wavelength-division multiplexing transmission, in which a combination of dopants in the fibre core enables a high signal/noise ratio to be reached for all channels in a predetermined wavelength band, even in the presence of several signals simultaneously fed.

The above result is achieved by the use of amplifying fibres in which the selection and metering of appropriate secondary dopants to be used together with the main dopant enable a gain curve free of substantial depressions over the whole amplification band to be reached.

More particularly, U.S. patent application Ser. No. 08/367,719 pertains, among other things, to an optical telecommunication system comprising:

transmitting means generating optical signals in a predetermined wavelength band, receiving means, an optical fibre line for connection between said transmitting and receiving means, active-fibre optical amplifying means disposed along said line, operatively connected with each other for transmitting said optical signals from said transmitting to said receiving means, characterized in that said optical amplifying means comprises at least one silica-based active optical fibre the core of which is doped with at least one fluorescent main dopant and at least one secondary dopant, in functional relation with each other so as to provide an optical signal/noise ratio at the receiving means not lower than 15 dB (measured with a filter amplitude of 0.5 nm) for each signal at a wavelength included within said band, both for a single signal in said band and in the presence of at least two signals at different wavelengths within said band, simultaneously red to said amplifying means.

Preferably, said fluorescent main dopant is erbium, in the form of an oxide and said secondary dopants are aluminium, germanium, lanthanum, in the form of the respective oxides. The predetermined transmission band is preferentially included between 1530 and 1560 nm. Preferably, the line according to the invention is comprised of at least three optical amplifiers serially connected along the line, at least one of which has an active fibre the core of which is doped with aluminium, germanium, lanthanum and erbium in the form of the respective oxides.

For use of such a line in an optical telecommunication system an appropriate pre-amplifier is required, which is located between the line and the receiver. By "pre-amplifier" it is intended an amplifier suitably sized for receiving a low-power signal and amplifying it, before sending it to a receiving device, until it reaches a power level appropriate to the device sensitivity. (In the following the term "level" will be used to identify a "power level" in a short manner). The pre-amplifier also has the task of restraining the signal dynamics, by reducing the level variation in the signals entering the receiver with respect to the level variation in the signals from the transmission line. In fact, a change in the conditions alone the line could cause a level variation in the outgoing signals. This change can be due either to the connecting fibre decay (which results in a loss of transparency) and possible anomalies in the same (for example localized attenuations caused by handling of the cable containing the optical fibres) or to the optical amplifier decay. In the case of the described transmitting line, variations are provided until a maximum value of 20 dB. On the other hand, at the entry of the optical receiver, if the latter is made according to the European specifications SDH or U.S. specifications SONET, the signal level must be included within an interval ranging from −26 dBm to −11 dBm. In order to ensure a safety margin, keeping into account the construction tolerances of the pre-amplifier, the level of the signals entering the optical receiver is required to be included between −25 dBm and −13 dBm. Therefore the pre-amplifier must compress the signal dynamics so as to bring the signal level to a value within this interval.

In patent application U.S. Pat. No. 5,579,153 filed in the name of the assignee of this application is herein incorporated by reference, it is described an optical amplifier having a power limitation at the exit, the general diagram of which is shown in FIG. 1. It consists of a rare earth-doped optical fibre divided into two portions 4, 6, fed by a signal 1 and a pumping radiation from a pumping laser 2 through a dichroic coupler 3. Fitted along the fibre is an element 5 absorbing the radiation to a greater degree at the signal wavelength than at the pump wavelength.

The principle on which operation of such an amplifier having a power limitation is based is illustrated with reference to FIG. 2 showing the course of the pumping power (expressed in mW on the ordinate on the left) and the signal level (expressed in dBm on the ordinate on the right) relative to the normalized fibre length (on the abscissa). Two cases are shown: an input signal of −25 dBm (a "weak" signal, in solid line) and an input signal of 0 dBm (a "strong" signal, in dotted line). The input pumping power is 20 mW. The equalizing action results from an equilibrium between the pump power and amplified signal power in the two stages, before and after the localized attenuation. In the first stage (fibre 4) the "strong" signal is amplified to a level higher than the weak signal. The "weak" signal, however, utilizes the pumping power less, the residual component of said power in the second stage (fibre 6) being sufficient to amplify the signal to the desired output level.

The "strong" signal, on the other hand, utilizes the pump energy in the first stage almost completely. Towards the end of the second stage the residual pumping power is very low and the signal is amplified to a small extent or even slightly attenuated so that it reaches the same level as the "weak" signal. The intermediate-level input signals between the two stated limits obviously develop in the same manner towards the same output level. By conveniently selecting the position of an absorber 5 along the fibre such an amplifier ensures signals having a constant output level within 1 dB in the presence of input signals having a variable level within an interval of at least 15 dB.

The device described in U.S. Pat. No. 5,579,153 to be used in the cases in which an optical amplifier having a strong compression of the signal dynamics is required, is convenient for employment as a pre-amplifier in a point-to-point communication system, that is, free of intermediate amplifiers along the fibre connecting a transmitter and a receiver. In this case the device is fitted between the passive connecting fibre and the receiver.

The U.S. Pat. No. 5,280,383 to J. F. Federici et al, discloses a two-stage optical amplifier capable of operating at a reduced pumping power. The first stage operates under linear amplification conditions, the second stage under saturation conditions, so as to cause a certain compression of the signal dynamics. In one of the embodiments the two stages are separated by an isolator which may be followed by a filter having a passband of about 10 nm. The isolator removes the counter-propagating amplified spontaneous emission, whereas the bandpass filter removes part of the propagating amplified spontaneous emission in the signal direction, allowing the selected 10 nm band to pass. Unlike the amplifier described in U.S. Pat. No. 5,579,153, however, each stage has an independent pumping source and the bandpass filter absorbs any residual pump power from the first stage. Therefore this amplifier is not based on the described mechanism involving a differential pump absorption (depending on the signal level) in the first stage and residual-pump exploitation (in the case of weak signals) in the second stage, which is utilized in the amplifier described in U.S. Pat. No. 5,579,153. In the presence of a filter, in addition, this amplifier can operate only in a transmission band restricted to less than 10 nm, insufficient for a wavelength-division multiplexing transmission.

Article "REAP: Recycled Erbium Amplifier Pump", by J.-M. P. Delavaux et al. published in IEEE Photonics Technology Letters, vol. 6, No. 3, Mar. 3. 1994, pages 376–379 describes a two-stage pre-amplifier having an erbium-doped fibre, utilizing in the second stage the residual pump power from the first stage, wherein the use of an optical isolator in series with a bandpass filter with a bandwidth of 6 nm (−1 dB) between the two stages of the device enables a high gain to be achieved as well as a low noise figure for a signal of a wavelength included within the transmission band of the filter, in addition to a certain compression of the signal dynamics. In particular, by restricting the transmission band of the device to the filter passband, the spontaneous emission to the other wavelengths is removed, so that it does not degrade the reversing condition of the first stage or saturate the second stage. The above article relates to the transmission of a single channel with a wavelength within the filter transmission passband. Nowhere does the article suggest possible applications of the device in a WDM optical telecommunication system.

For the purpose of achieving a multi-wavelength transmission, the Applicant has tried to use the device described in U.S. Pat. No. 5,579,153 as the pre-amplifier at the end of a WDM transmission line with cascade amplifiers as described in U.S. patent application Ser. No. 08/367,719.

However the expected compression of the signal dynamics between the input and output was found to occur to a reduced extent only: in the case of a 20 dB variation in the input signal level, a 14 dB variation was obtained in the output signal level, which variation is greater than that allowed by the above standards.

This drawback is deemed to be connected with the spontaneous emission and the effect of the amplification thereof on the pumping energy absorption in the two stages of the device. In the case of an optical WDM telecommunication, at the exit of the wide-band transmission line with cascade amplifiers, a spontaneous-emission component is present close to the signals at different wavelengths, which is distributed according to a continuous spectrum, typical of the type of amplifying fibres employed along the transmission line. The amplified signal level is higher than the level of the spontaneous emission at the respective wavelength and this ensures a signal/noise ratio sufficiently high to enable a faultless reception. The overall power of the spontaneous emission, however, is connected with the intensity of the transmitted signals. Weak signals are amplified along the line with a moderate exploitation of the energy supplied by the pump, so that most of this energy amplifies the spontaneous emission. Stronger signals empty to a greater degree the levels excited by the pump and the available energy for a spontaneous emission and amplification thereof is smaller. In addition to depending on the level of the transmitted signals, the spontaneous emission grows based on the number of the amplifying stages connected in cascade.

In the case of a wide-band transmission line having amplifiers in cascade and connected to a device of the type described in U.S. Pat. No. 5,579,153, the spontaneous emission from the transmission line is further amplified along the active fibre of the device and is added to the spontaneous emission generated in the active fibre itself.

It has been observed that the spontaneous emission, even if of a lower level than the signals, through dissipation of pumping energy, modifies the mechanism of the differential absorbtion of the pump for weak and strong signals, on which the compression effect of the signal dynamics of the device described in U.S. Pat. No. 5,579,153 is based. More particularly, in case of weak signals, the spontaneous emission is relatively strong and its amplification absorbs the energy made available by the pump already in the first stage of the pre-amplifier. Therefore the second stage is not reached by sufficient pumping energy to enable amplification of the weak signals to the same output level as obtained with stronger input signals, overlapped by a lower spontaneous emission and utilizing the pumping energy present in the first stage of the pre-amplifier. As a whole, therefore, the second stage is not used in an appropriate manner in the case of weak signals due to a shortage of residual pumping energy.

The good operation of the device described in U.S. Pat. No. 5,579,153 as a pre-amplifier in the case of a "point-to-point" communication system is explained by the fact that in that case the signals from the communication line are not overlapped by a relatively high amount of noise with a spectral distribution similar to the spontaneous emission of the active fibre of the device. The device is inserted between the passive connecting fibre and the receiver and the only spontaneous emission present in the pre-amplifier is the one produced along the active fibre of the amplifier itself, of a relatively low value.

SUMMARY OF THE INVENTION

A solution to the pointed out problems is given by the present invention enabling to operate with transmission lines characterized by a very wide (25–30 nm) passband and a spontaneous-emission level comparable to the signal level.

The Applicant has discovered that, by attenuating the spontaneous emission in a wavelength band, contiguous to the signal band the pump absorption caused by amplification of the spontaneous emission is limited to a degree sufficient to ensure that the last stage will always have at its disposal the pump power necessary to amplify the signals to the desired level. In particular it has been found that to this end it is not necessary to completely remove the spontaneous emission at all wavelengths different from the signal wavelength, as previously proposed. It is sufficient to attenuate by a value higher than the predetermined minimum, the spontaneous emission in a given wavelength interval close to the signal band, of which spontaneous emission has been found to have a substantial effect on the limitation or the signal dynamics.

According to one aspect, the present invention relates to an optical telecommunication system comprising:

transmitting means generating at least two optical signals with different wavelengths included in a predetermined wavelength band, receiving means, an optical fibre line for connection between said transmitting means and receiving means, active-waveguide optical amplifying means disposed along said line operatively connected with each other to transmit said optical signals from said transmitting means to said receiving means, characterized by the presence of an optical pre-amplifier located between said optical-fibre line and said receiving means, comprising:

an optical rare-earth-doped waveguide fed, through coupling means, with pumping radiation at a pumping wavelength and with signals from said optical-fibre line, differential-attenuation means, located at a first predetermined position along said doped waveguide, capable of causing an attenuation in said predetermined wavelength band greater by a given amount than the attenuation caused at said pumping wavelength, filtering means located at a second predetermined position along said doped waveguide and provided with a spectral attenuation curve adapted to transmit signals at said predetermined wavelength band without attenuating them to a substantial degree and to attenuate by a value higher than a predetermined minimum the spontaneous emission at a wavelength band contiguous to said predetermined band, wherein said first and second predetermined positions, said given attenuation amount of the differential—attenuation means, said predetermined attenuation minimum of the filtering means and said wavelength band continuous to said predetermined band are selected in such a functional relation with respect to each other that power variations in one of the input signals to the pre-amplifier within a range of 20 dB involve power variations included in a range not greater than 12 dB inputted to the receiving means.

Preferentially, said wavelength band contiguous to the predetermined signal band contains a relative maximum of the spontaneous emission of the optical waveguide doped with a rare earth material being part of the pre-amplifier.

Preferably, said wavelength band contiguous to the predetermined signal band contains a relative maximum of the spontaneous emission of the active waveguide being part of the amplifying means.

It is possible to restrain the power variations inputted to the receiving means, for variations of 20 dB in the input level of one of the signals, to 9 dB and, by conveniently selecting the filtering means, to 6 dB.

The filtering means is inserted along the doped waveguide preferably at a position between 15% and 50% of the overall length of said waveguide, more preferably between 20% and 30%.

Preferentially, the differential-attenuation means is inserted along the doped waveguide between the filtering means and the exit, in particular at a position between 50% and 75% of the overall length of the waveguide.

Second filtering means may be provided which is adapted to transmit the signals without attenuating them to a substantial degree and to attenuate the spontaneous emission at least at one wavelength band continuous to that of the signals. This second filtering means is advantageously located along said doped waveguide between 50% and 75% of the overall length of the waveguide.

The doped optical waveguide is preferentially a silica-based optical fibre and the rare earth material used as the main dopant is preferably erbium. As the secondary dopants, aluminium, germanium and lanthanum or aluminium and germanium may be advantageously used. The filtering means preferably have a cut-off wavelength (at −3 dB) included between 1532 and 1534 nm. Said wavelength band of the signals preferentially comprises the band between 1535 and 1560 nm.

The filtering means may consist of a portion of optical fibre having two cores optically coupled to each other for wavelengths in the spontaneous emission band continuous to the signal band, with one of the two cores which is coaxial with the fibre and connected at the two ends to the doped waveguide and with the other core which is off-centre and cut off at the ends. Alternatively, the filtering means may advantageously consist of an interference filter used in its reflection mode of operation. The filtering means may also comprise a preferential low-attenuation path for the pump wavelength. For example, said filtering means may comprise: a first dichroic coupler separating the radiation in the signal and spontaneous-emission band (to a first terminal) from the radiation at the pump wavelength (to a second terminal); a filter, connected to the first terminal and capable of attenuating the spontaneous emission; and a second dichroic coupler combining the radiation from the filter with the radiation at the pump wavelength from the second terminal. The attenuation of said filtering means in the wavelength band contiguous to the predetermined signal band is preferably of at least 6 dB, more preferably of at least 10 dB.

The differential-attenuation means advantageously consists of: a first dichroic coupler separating the radiation in the signal band (to a first terminal) from the radiation at the pump wavelength (to a second terminal); an attenuating component, in particular an optical fibre, connected to the First terminal, capable of attenuating signals; and a second dichroic coupler combining the radiation from the attenuating element with the radiation at the pump wavelength from the second terminal. An optical isolator can be inserted between the attenuating component and the second dichroic coupler.

The differential-attenuation men may also be comprised of a winding having a predetermined bending radius and consisting of one or more turns of optical fibre, optionally a portion of the same doped optical fibre used for the amplifier.

Preferentially, the attenuation of the differential-attenuation means in the signal band is greater than the attenuation at the pump wavelength by an amount of 5±1 dB.

The optical telecommunication system according to the invention is particularly advantageous in the case in which the amplifying means consists of three or more active-fibre optical/amplifiers disposed in cascade amplifiers along the optical-fibre connecting line. In the case of cascade amplifiers, in fact, the problem of a spontaneous-emission accumulation along the line is particularly felt, above all with a wideband transmission, which problem is coped with and solved by the system according to the present invention.

The optical amplifying means may comprise a silica-based active fibre, having a core doped with at least one fluorescent main dopant and at least one secondary dopant, in such a functional relation with respect to each other that they provide an optical signal/noise ratio at the reception, measured with a 0.5 nm filter amplitude, which is not lower than 15 dB for signals of a wavelength included in said predetermined band when the input signal power at each of said active-fibre optical amplifiers is not lower than −16 dBm. Advantageously said main dopant is erbium and said secondary dopants are aluminium, germanium and lanthanum.

According to a second aspect, the present invention relates to an optical amplifier comprising:

a rare-earth-doped optical/waveguide, input means for one or more signals included in a predetermined wavelength band and a predetermined range of input powers, pumping means for said doped waveguide, adapted to provide optical pumping power at a pumping wavelength, coupling means within said doped waveguide of said optical pumping power and said input signal or signals, output means emitting at a given output level, one or more output signals amplified by the stimulated emission of said rare earth material submitted to pumping in said doped waveguide, differential-attenuation means located in a first predetermined position along the active waveguide, capable of supplying a predetermined attenuation having a value at said predetermined wavelength bend which is different from the attenuation supplied at said pumping wavelength, characterized by filtering means located at a second predetermined position along said doped waveguide and provided with a spectral attenuation curve adapted to transmit the signals at said predetermined wavelength band without attenuating them to an important degree and to attenuate by a value higher than a predetermined minimum the spontaneous emission at a wavelength band contiguous to said predetermined band, wherein said first and second predetermined positions, said predetermined attenuation values of the differential-attenuation means, said predetermined attenuation minimum of the filtering means and said wavelength band contiguous to said predetermined band are selected in such a functional relation with respect to each other that power variations in one of the input signals within a range of 20 dB involve power variations in the output power from the amplifier included in a range not greater than 12 dB.

This optical amplifier may be advantageously made according to one or more of the preferential solutions suggested in connection with the pre-amplifier being part of the optical telecommunication system according to the first aspect of the present invention.

BRIEF DESCRIPTION OF THE DRAWINGS

More information will be drawn from the following description, with reference to the accompanying drawings, in which.

DESCRIPTION OF THE PREFERRED EMBODIMENTS

Figure 3:
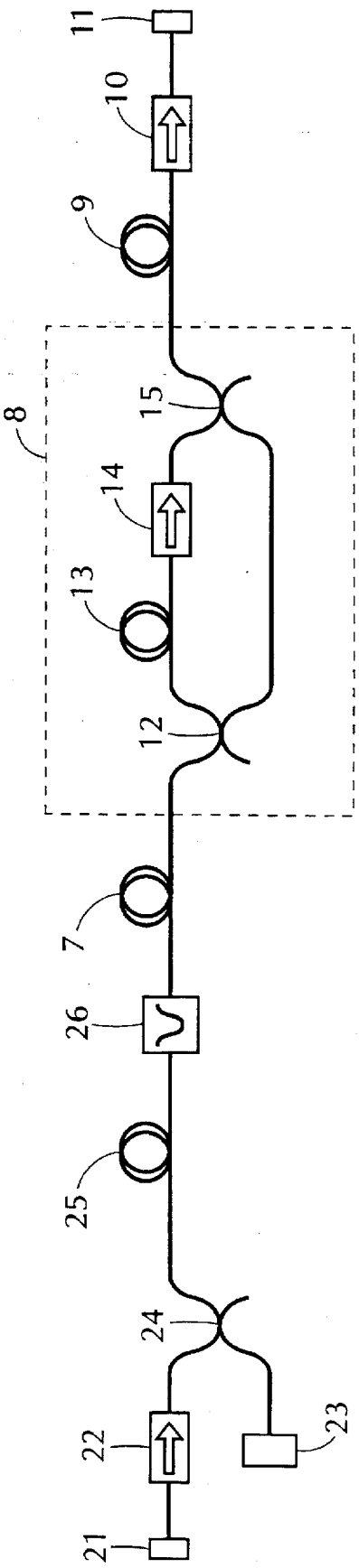
FIG. 3 is a diagram of an amplifier according to the present invention.
Figure 2:
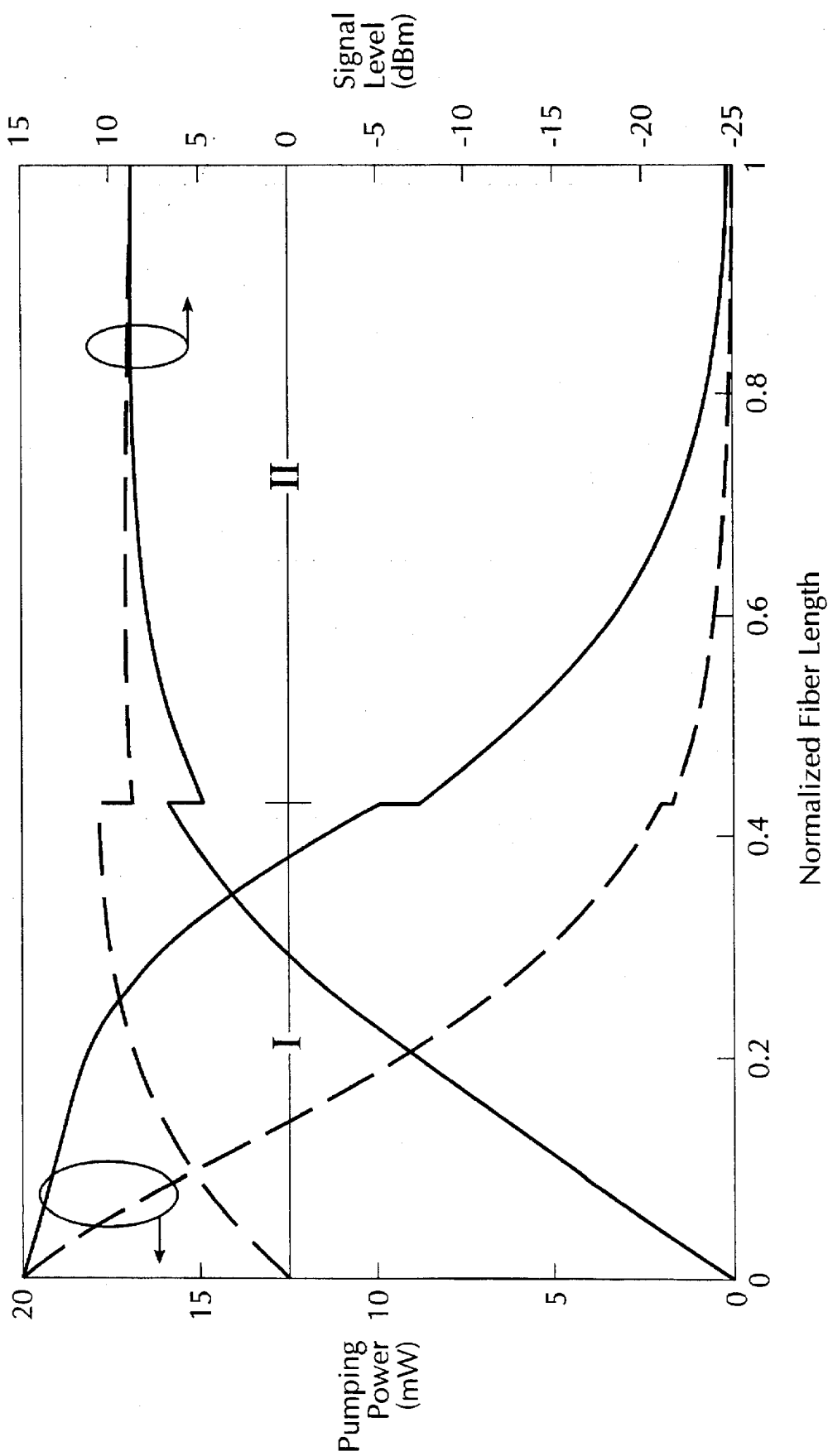
FIG. 2 shows the course of the pump power and signal level along the two stages of the amplifier in FIG. 1, for two input signals of different power.

An embodiment of an amplifier according to one aspect of the present invention is shown in FIG. 3. Conveniently said amplifier can be employed as a pre-amplifier in an optical WDM communication system with cascade amplifiers, it provides a rare-earth-doped optical fibre, preferably an erbium-doped fibre, divided into three portions 5, 7 and 9 and fed with a pumping signal from a laser 3 through a dichroic coupler 4. Signals at different wavelengths included in a given transmission band, entering through an input terminal 1, pass a first optical isolator 2 and are sent, through the dichroic coupler 4, to the first portion 5 of doped fibre. Portion 5 is connected to the fibre portion 7 through a notch filter 6 which is capable of attenuating the spontaneous emission present in a wavelength band contiguous to the signal transmitting band. This filter, on the contrary, has a neglible attenuation in the signal wavelength band and at the pumping wavelength.

Signals are further amplified in the fibre portion 7, which terminates with a differential attenuator 8 causing an attenuation in the signal band greater by a predetermined amount than the attenuation caused at the pumping wavelength.

In the example shown operation of the attenuator 8 involves the steps of separating the incident radiation according to the wavelengths, attenuating the signal component and leaving the pump unchanged, and subsequently recombining the two components. Radiation at the signal wavelength is guided by a dichroic coupler 12 towards an attenuating fibre 13, where it is attenuated by a predetermined factor. Fibre 13 can be followed by an optical isolator 14 furnishing a further attenuation in the signal propagation direction. The pumping radiation passes free of attenuation (if the small loss due to the couplers is ignored) along another branch of the dichroic coupler 12 and is recombined with the signals in a dichroic coupler 15. In the example the attenuating fibre 13 consists of a 0.4 m long silica-based fibre doped with titanium having a numerical aperture (NA) of 0.109, a cut-off wavelength of 1180 nm and attenuation of about 5.1 dB at 1550 nm.

The isolator 14 may be comprised of, or replaced by second filtering means including a filter of the type described with reference to filter 6 and having the same attenuating features and filtered band as the latter. Said second filtering means helps in eliminating the spontaneous-emission fraction further generated in the fibre portion 7 in said band contiguous to the signals.

The last fibre portion 9, connected to the attenuator exit 8, acts on the signals by amplifying or attenuating them depending on the greater or lesser residual pump power, that is, ultimately, on the input signal level, which will result in a compression of the output signal dynamics with respect to the input signal dynamics. Signals are then transmitted through an isolator 10 to an output terminal 11.

As the active fibre, a silica-based fibre doped with Er/Al/Ge/La of the type described in U.S. patent application Ser. No. 08/367,719 has been used, the core having the following composition expressed in percent content by weight of oxide:

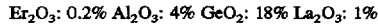

Figure 4:
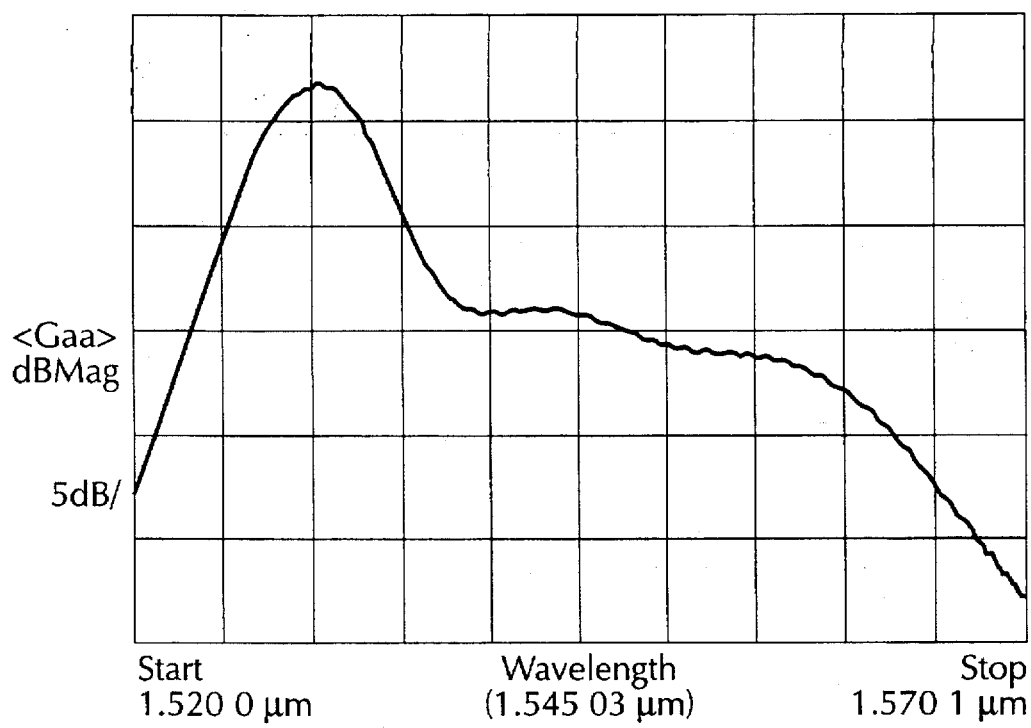
FIG. 4 is the spontaneous-emission spectrum of an Er/Al/Ge/La-doped fibre.

Such a fibre had a numerical aperture of 0.219 and a cut-off wave-length of 911 nm. The emission curve of this type of fibre is reproduced in FIG. 4 which has been obtained by using a 11 m long fibre submitted to pumping at 980 nm with a pump power transmitted to the fibre of about 60 mW. The selected length for the fibre corresponds to an efficient utilization of the adopted pump power. As can be seen from the figure, this fibre has a spontaneous emission with a peak at 1530 nm.

The filtering means is preferably disposed along the waveguide at a location different from the waveguide entry. Thus the filtering means can remove not only the spontaneous emission from the transmitting line, but also part of the spontaneous emission generated alone the waveguide and in this way prevent the amplification of the spontaneous emission from using up the available pump energy thereby impairing the device ability to amplify weak signals. Positioning of the filtering means at the waveguide entry would increase the input losses, worsening to the same extent the noise figure at the wavelength of operation of the filter.

In accordance with the above, the filter position is therefore selected for the purpose of causing said filter to eliminate or attenuate both the spontaneous-emission peak contiguous to the signal band and progressively formed alone the line, and a substantial fraction of the peak of the spontaneous emission generated in the first portion of the amplifier, so as to make the above described compression mechanism efficient, without on the other hand adversely affecting the signal when it is of a low intensity.

In the described structure a convenient position for filter 6 is between 15% end 50%, and preferably between 20% and 30% of the overall length of the active fibre of the amplifier.

The position of the differential attenuator 8 may be selected based on the criteria described in the above mentioned patent application U.S. Pat. No. 5,579,153, in particular between 50% and 75% of the overall length of the active fibre.

A person skilled in the art, in the presence of specific features of the employed system and devices will be able to select the most appropriate locations, case by case, in order to accomplish the operating mechanism of the invention, as described.

In the example shown, the fibre portions 5, 7 and 9 have been selected with a length of 3, 5 and 5 m respectively, corresponding to a positioning of the filter 6 and differential attenuator 8 approximately at 23% and 62% respectively of the overall length of the doped fibre.

The notch filter 6 is of the type having an optical fibre portion with two cores optically coupled to each other at a preselected wavelength, one of them being coaxial with the connected optical fibres and the other off-centre and cut off at the ends, as described in patents U.S. Pat. No. 5,218,665 and U.S. Pat. No. 5,087,108 filed in the name of the assignee of this application, the description of which is herein incorporated by reference. Said filter is such sized that it couples in the off-centre cove a band of wavelengths, corresponding to the spontaneous-emission peak of the doped fibre, contiguous with the transmission band of the signals. Cutting-off at the ends of the off-centre core enables the wavelengths transferred thereinto to be dispersed in the fibre cladding, so that they are no longer recoupled in the main core.

In the experiment carried out, a two-core fibre of the described type has been used. It is a silica-based germanium-doped fibre having the following parameter values:

| attenuation at 1530 nm | 6 dB |
| wavelength corresponding to a 3 dB attenuation | 1533 nm |
| filter length | 35 mm |
| distance between the cores | 18 μm |
| diameter of the centre core | 4 μm (NA 0.195) |
| diameter of the off-set core | 9 μm (NA 0.135) |

Figure 5:
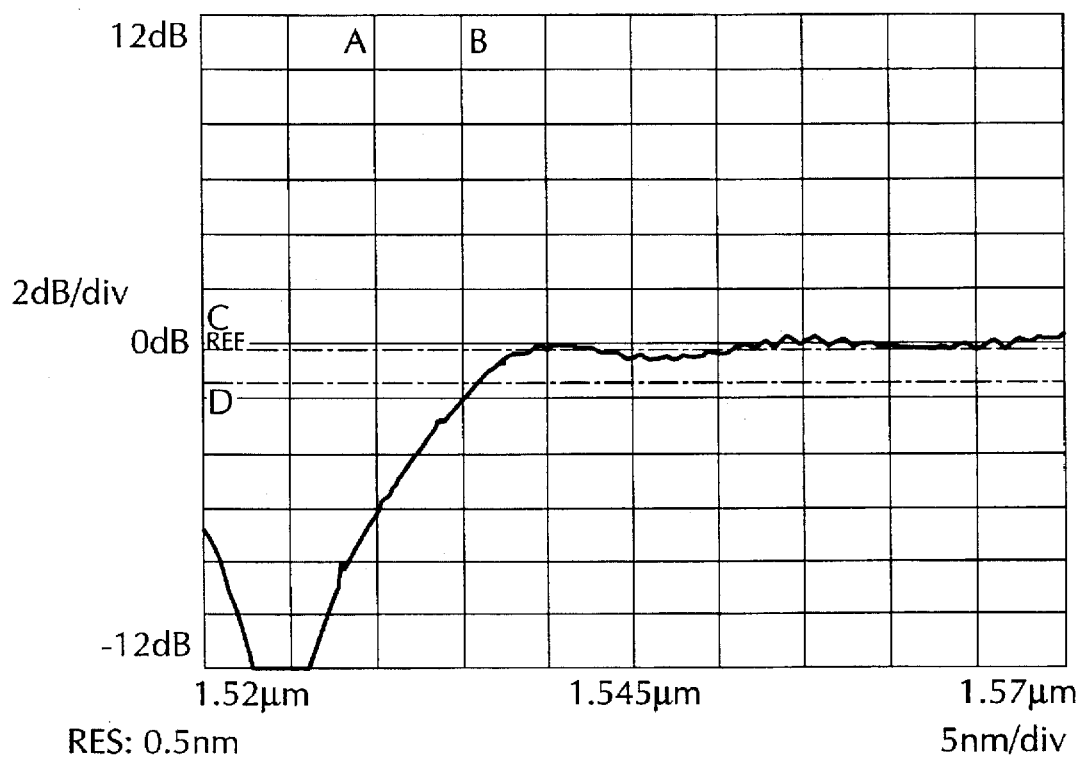
FIG. 5 is the transmitting feature of a notch filter of the type involving a two-core optical fibre and adapted for use in the amplifier.

The spectrum response curve of the two-core filter is reproduced in FIG. 5.

The pump laser 3 is a laser of the Quantum well type having the following features:

| emission wavelength | $\lambda_p = 980$ nm; |
| Maximum optical output power | $P_u = 70$ mW. |

Lasers of the above type are produced, for example, by LASERTRON Inc., 37 North Avenue, Burlington, Mass., (U.S.).

The dichroic couplers 3, 8 are fused-fibre couplers, made up of single-mode fibres at 980 nm and in the 1530–1560 nm wavelength band, with variations<0.2 dB in the optical output power depending on polarization. Dichroic couplers of the above type are known and available on the market and are for example produced by GOULD Inc., Fibre Optic Division, Baymeadow Drive, Glem Barnie, Md., (U.S.), and SIFAM Ltd., Fibre Optic Division, Woodland Road, Torquay, Devon, (GB).

Optoisolators 2, 10 and 14 are optical isolators in which the polarization control is independent of the transmission signal polarization and have an isolation greater than 35 dB and a reflectivity lower than −50 dB. The isolators herein used are a MDL I-15 PIPT-A S/N 1016 model available from ISOWAVE, 64 Harding Avenue, Dover, N.J.,(U.S.).

Figure 6:
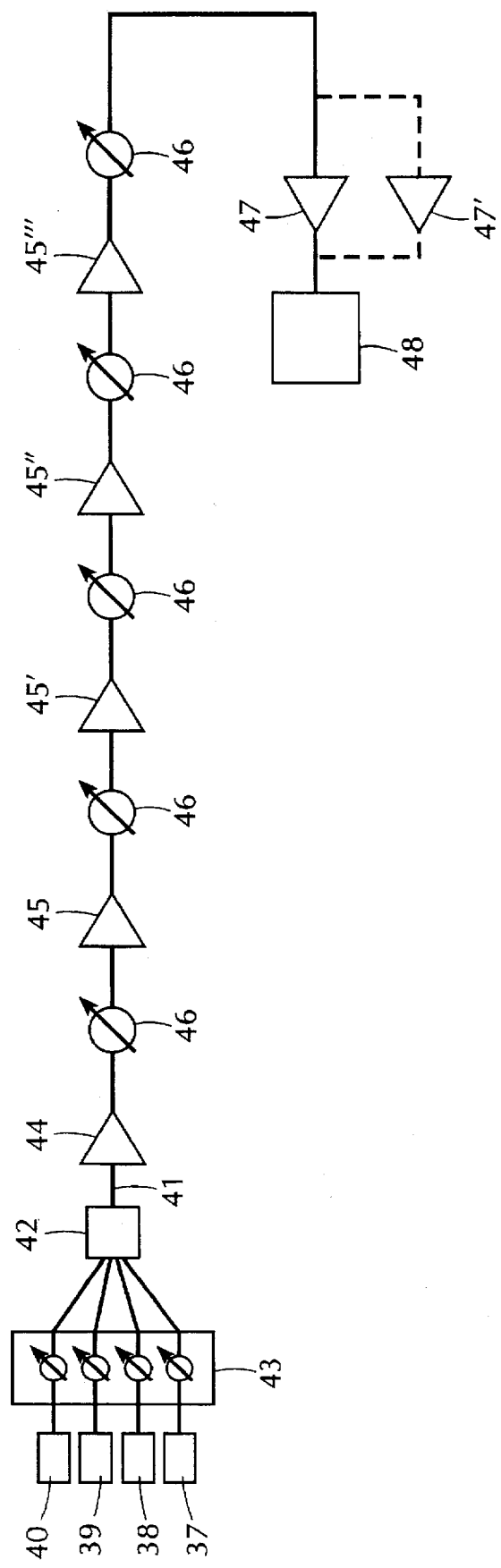
FIG. 6 is the diagram of an experiment for measuring the features of an amplifier according to the present invention.

Shown in FIG. 6 is the experimental configuration employed for measuring the properties of the described amplifier. In such experiments four signals 37, 38, 39, 40 at the wavelengths $\lambda_1$=1536 nm, $\lambda_2$=1544 nm, $\lambda_3$=1550 nm and $\lambda_4$=1556 nm respectively, have been fed to a fibre 41, through a wavelength multiplexer 42.

Signals were respectively generated by a DFB laser at 1536 nm, incorporated in the end apparatus constituting the receiver; an ECL laser, at a variable wavelength preselected at 1544 nm, with a continuous emission, model HP81678A, produced by HEWLETT PACKARD CO., Rockwell, Md. (U.S.); a DFB laser at 1550 nm, with a continuous emission, produced by ANRITSU Corp., 5-10-27 Minato-ku, Tokyo (JP); a DFB laser at 1556 nm, with a continuous emission, produced by ANRITSU. The multiplexer 42 was made by means of a 1×4 splitter, produced by E-TEK DYNAMICS Inc., 1885 Lundy Ave., San Jose, Calif., (U.S.).

The level of the input signals to the line was adjusted by a pre-equalizer 43. After a booster 44, signals were sent to a transmission line comprising four line amplifiers 45, 45', 45", 45"', having respective variable attenuators 46 therebetween, adapted to simulate respective optical fibre portions having different attenuation conditions. The optical amplifier according to the present invention and previously described with reference to FIG. 3 was put at the end of the transmission line. The amplifier exit was connected to an optical spectrum analyzer 48.

The pre-equalizer 43 consisted of four variable attenuators 43a, produced by JDS FITEL Inc., 570 Heston Drive, Nepean, Ontario (Calif.), the attenuation of which was adjusted depending on the optical power of the respective channel. Booster 44 was a TPA/E-12 model, available from said Assignee. Amplifiers 45, 45', 45", 45"' were identical to each other and each supplied a gain of about 30 dB, with an overall output power of +14 dBm. Said amplifiers used an Er/Al/Ge/La-doped fibre proposed in U.S. patent application Ser. No. 08/367,719 and previously described. The optical attenuators were a VA5 model produced by JDS FITEL (mentioned above). The optical spectrum analyzer was a TQ8345 model produced by ADVANTEST CORPORATION, Shinjuku-NS Bldg., 2-4-1 Nishi-Shinjuku, Shinjuku-ku, Tokyo (JP).

EXPERIMENT 1

In a first experiment the attenuators 46 each supplied a 28 dB attenuation corresponding to about 100 km of optical fibre. The overall power and the power of the signals alone both at the entry and exit of the amplifier 47 embodied with a notch filter were measured. The overall power measured at the entry was 25.1 µW (−16.0 dBm), of which 3.7 µW (−24.3 dBm) represented the signal power. Therefore the ratio between the signal power and overall power was 0.147. The overall power at the amplifier exit was 2.81 mW (4.5 dBm) of which 0.88 mW (−0.55 dBm) corresponded to the signal power. At the exit the ratio between the signal power and the overall power was 0.313, which ratio was more than doubled with respect to the entry.

EXPERIMENT 2

In a second experiment the above described amplifier 47 was compared with an amplifier 47' according to the known art, formed with components and specifications similar to those used for amplifier 47 and described with reference to FIG. 3, but omitting the notch filter 6 and connecting the fibre portions 5 and 7 together.

Figure 7A:
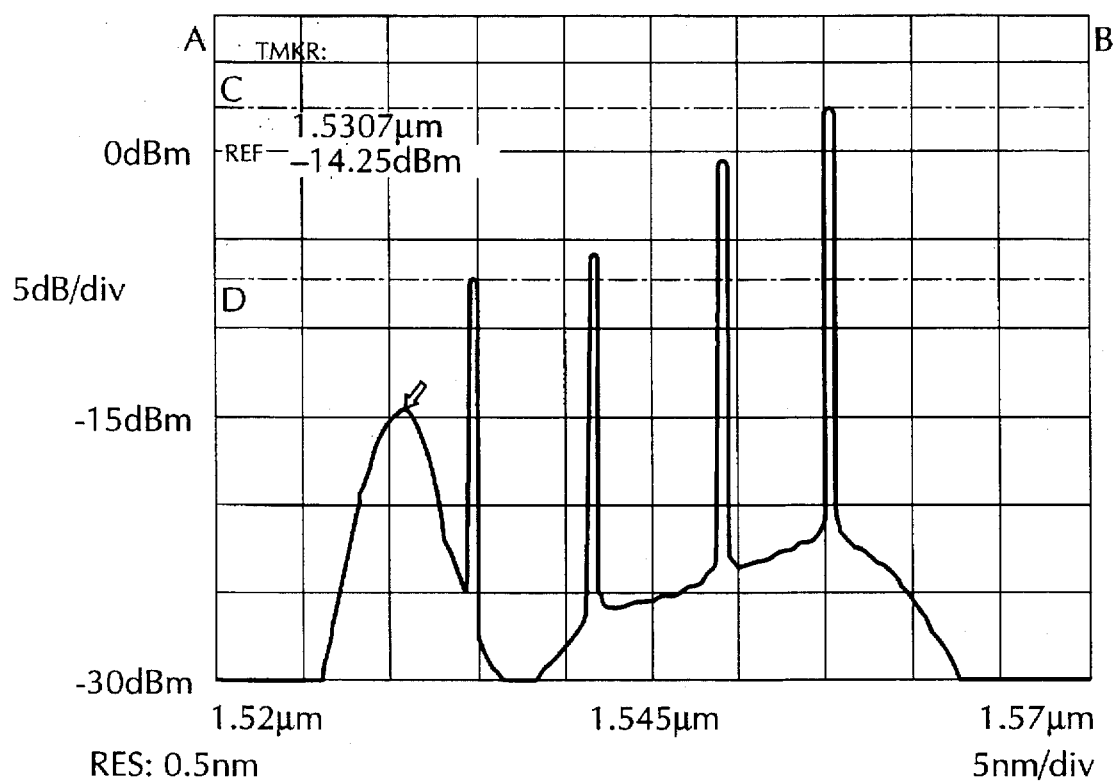
FIG. 7 is an input (A) and output (B) spectrum to and from the amplifier in the case of four signals fed through a transmitting line, with cascade amplifiers having a 20 dB attenuation between the amplifying stages.
Figure 7B:
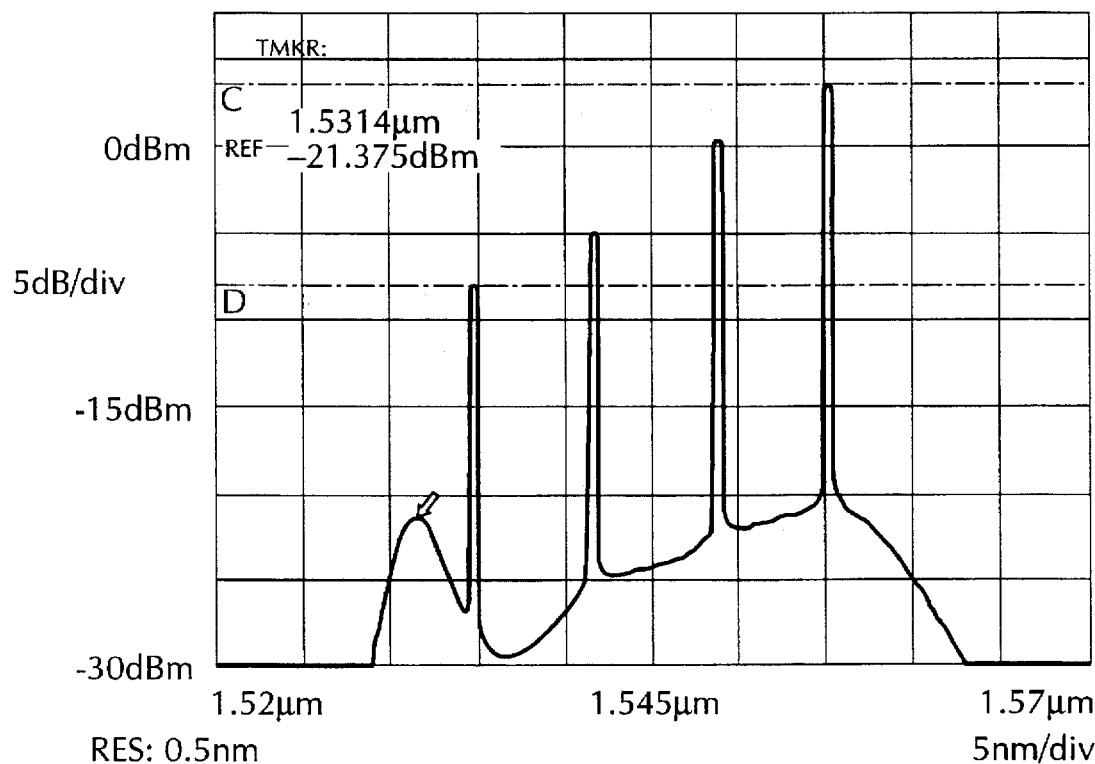

FIGS. 7A and 7B show the spectra measured at the exit of amplifiers 47' (without a notch filter) and 47 (with a notch filter) respectively, in the case in which the variable attenuators 46 were adjusted so each supplies an attenuation of 20 dB. These attenuation values correspond to a transmission line under a normal operation condition, with "strong" signals at the amplifier 47 or 47' entry. The comparison of the figures shows that in the case of "strong" signals the two amplifiers behave in the same manner, ensuring equivalent output levels for the signals. It should be noted that the difference in the output level between the signals at different wavelengths, that is the different height of the signal peaks, that is found in both cases, is attributable to the different amplification factor at the different wavelengths of the transmission line with the optical amplifiers 45. However, this difference does not affect the signal/noise ratio, that is the transmission quality. The level of the individual signals in the case of use of the amplifier provided with filter, on the contrary, remained almost the same as in the case without filter. The positions on the Y-axis of lines C and D in the two figures show the highest and lowest output levels of the four test signals, respectively with $\lambda_4$=1556 nm and $\lambda_1$=1536 nm. The signal at $\lambda=\lambda_4$ had an output level of 2.6 dBm in the case without filter (FIG. 7A) and 3.5 dBm in the case with filter (FIG. 7B), whereas the signal at $\lambda=\lambda_1$ had an output level of −7.1 dBm in the case without filter and −8.3 dBm in the case with filter. In addition, it is possible to note that, as expected, the spontaneous emission with a wavelength close to the peak at 1531 nm was greatly attenuated in the presence of the notch filter as compared with the case free of filter.

EXPERIMENT 3

Figure 8A:
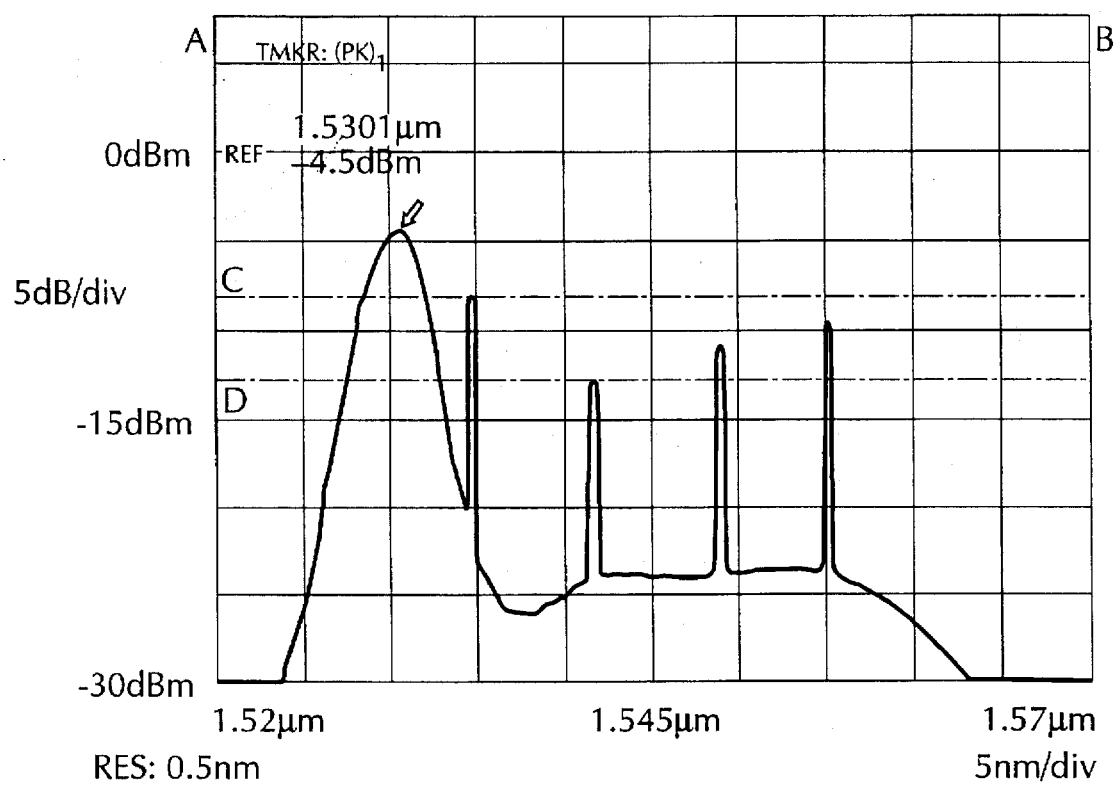
FIG. 8 is an input (A) and output (B) spectrum to and from the amplifier in the case of four signals fed through a transmitting line with cascade amplifiers having a 28 dB attenuation between the amplifying stages.
Figure 8B:
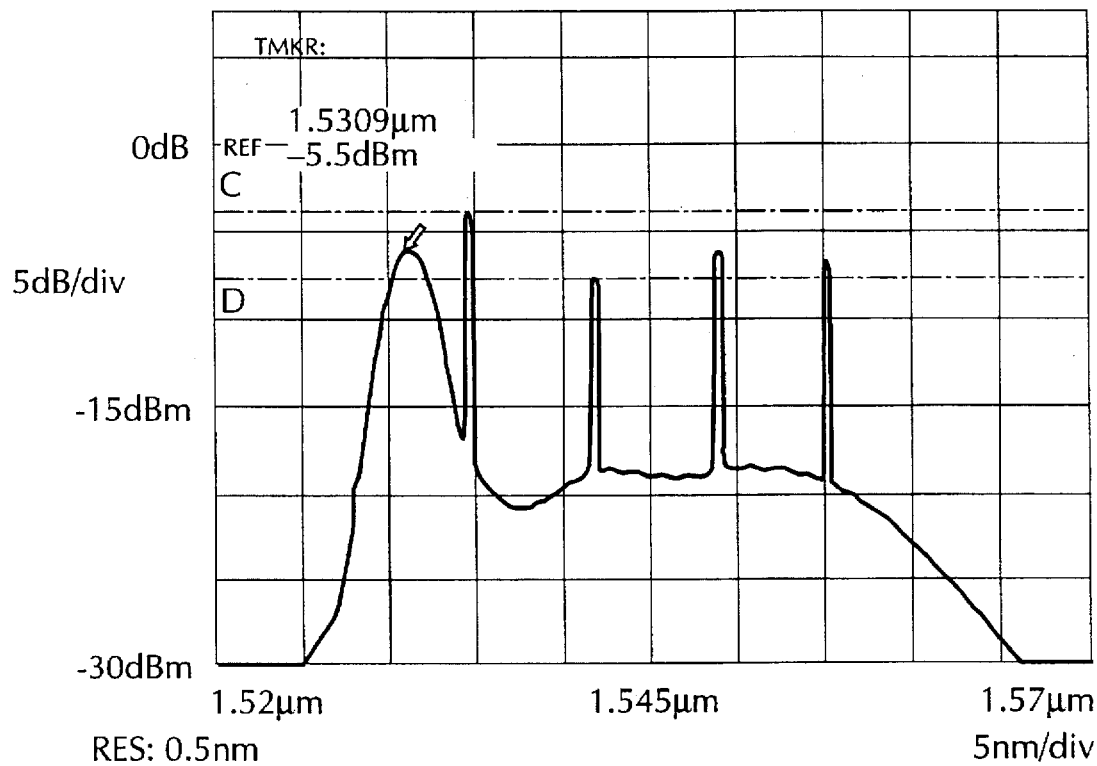

If we compare FIGS. 8A and 8B, we can appreciate the superiority of the amplifier according to the invention with respect to the device of the known art. Said figures are obtained in an experimental situation similar to that of experiment 2, with the only difference residing in the attenuation value of the variable attenuators 46 of FIG. 6 that for the new test was fixed to 28 dB for each of the attenuators. By selecting this value, simulation was done of the conditions of the strongest attenuation provided for operation of an optical communication line of the type described in U.S. patent application Ser. No. 08/367,719, as a result of localized attenuations along the fibres, attenuations due to the fibre aging or loss of amplification in the optical amplifiers. These conditions correspond to "weak" signals at the amplifier entry. FIG. 8A relating to the case in which the notch filter is absent, shows signal output levels included between −8.3 dBm ($\lambda=\lambda_1$=1536 nm, line C) and −12.9 dBm ($\lambda=\lambda_2$=1544 nm, line D). FIG. 8B, obtained in the configuration provided with the filter, shows on the contrary output levels included between −3.7 dBm ($\lambda=\lambda_1$, line C) and −7.2 dBm ($\lambda=\lambda_2$, line D), which are much closer (as compared with the case of FIG. 8A) to the output levels reached under low attenuation conditions (that is in the case of "strong" signals entering the amplifier). In this case too the effect of the notch filter can be found in the spontaneous-emission band contiguous to the signal band, which is greatly attenuated in the spectrum of FIG. 8B as compared with that of FIG. 8A. By comparing FIGS. 7B and 8B, relating to the experimental configuration of respectively "strong" and "weak" input signals, it is possible to see that in the first case the peak of the spontaneous emission has reached a reduced level with respect to the signals and in the second case a level comparable to the signals. The amplifier ensured a sufficiently high output level even in the case of "weak" input signals overlapping the spontaneous emission.

EXPERIMENT 4

Figure 9A:
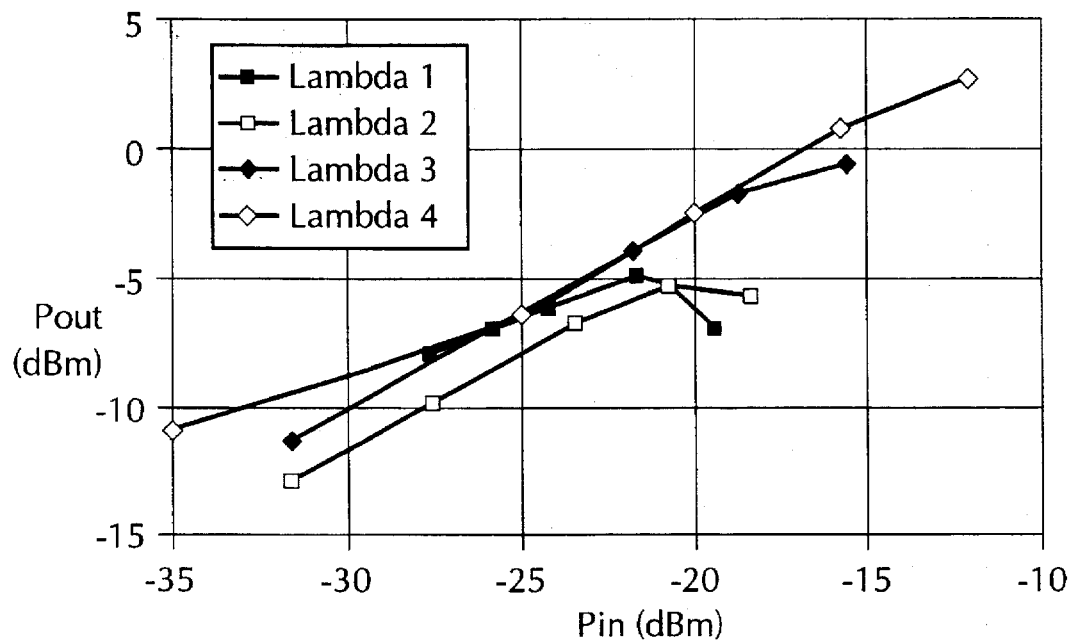
FIG. 9 shows a relation between the input level and output level for four-wavelength signals in the case of an amplifier according to the known art (A) and the present invention (B)
Figure 9B:
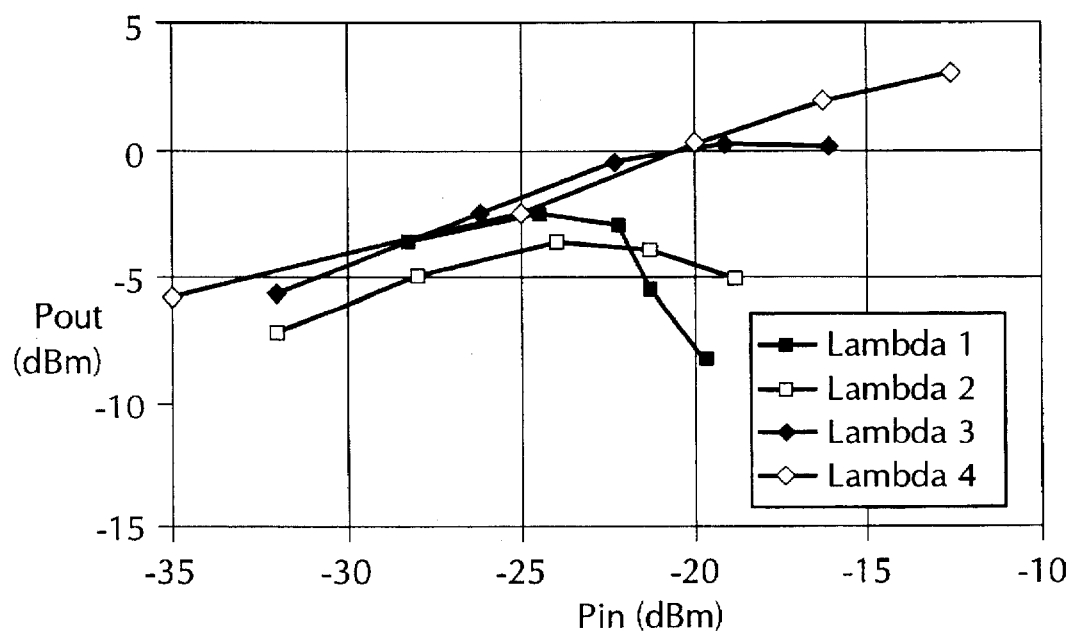

By a systematic series of tests, carried out varying the signal input level, data reproduced in FIGS. 9A and 9B were reached. These data show the greater compression of the signal dynamics reached with the amplifier of the invention, as compared to the known device according to the prior art. The curves reproduce the course of the signal power from the amplifier depending on the input signal power, for each of the four test wavelengths, both in the case in which the amplifier 47 is provided with a notch filter (FIG. 9B) and in the case of an amplifier free of filter (FIG. 9A). It will be noted that the output power variation is reduced to a substantial extent in the case of the device of the invention. In particular, by causing the variation of the input signal power in the range between −35 dBm and −12 dBm, a maximum difference of 9 dB between the highest (+3 dBm) and lowest (−6 dBm) output powers measured at one of the wavelengths ($\lambda=\lambda_4=1556$ nm) was reached in the case of the amplifier provided with a notch filter (FIG. 9B). In the case of the amplifier free of filter (FIG. 9A), the maximum difference between the end powers (+3 dBm and −11 dBm, respectively) was 14 dB under the same conditions for the input signals. It will be recognized that the power values from the amplifier, in the case of use of a notch filter, are higher than expected for a pre-amplifier having the above specified standards. However, taking into account the attenuation given by components such as a demultiplexer (6 dB in the case of four channels) and the filters (about 3 dB over each channel) that will have to be interposed between the pre-amplifier and the receiver, an additional attenuator of about 7 dB can be sufficient to bring the output powers back within the required range from −25 dBm to −13 dBm, without the quality of the reception being impaired.

The use of a filter 6 having a stronger attenuation at the spontaneous-emission peak and/or a greater slope in the spectral response curve can lead to a more efficient removal of the spontaneous emission and a greater compression of the signal dynamics.

In particular, the notch filter 6 can be an interference filter. Available on the market are interference filters operating as bandpass filters on transmission and notch filters on reflection. In particular, model WD1530TF1 produced by JDS FITEL lends itself to be used in the present invention. Data relating to the reflected component, that is the used one, is:

| | |
|---|---|
| attenuation at 1530 nm | 10 dB |
| wavelength corresponding to an attenuation of 3 dB | 1534 nm |

The output level variation expected with this filter is 6 dB for variations of 20 dB in the input level.

In addition to the above mentioned filters, filters of other types may be used provided they have similar or stricter properties in terms of the spontaneous-emission absorption and transparency in the signal transmission band and at the pumping wavelength.

As above stated, the attenuation of the filtering element 6 can be selected with a more or less high value in connection with the desired compression degree of the signal dynamics. However, it has been observed that for the purpose of enabling the differential-absorption mechanism of the pump for weak and strong signals to conduct to a signal dynamics adapted to the receiver features it is not necessary to use very high filtering values of the spontaneous-emission peak contiguous to the signals, as it is already sufficient to introduce an attenuation of said peak for achieving the desired results.

Figure 1:
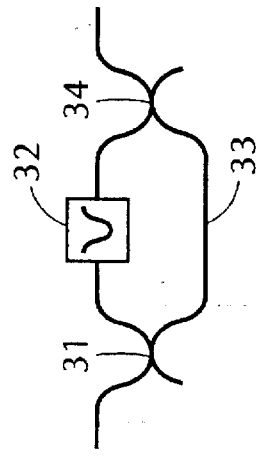
FIG. 1 shows a diagram of a known amplifier.
Figure 10:
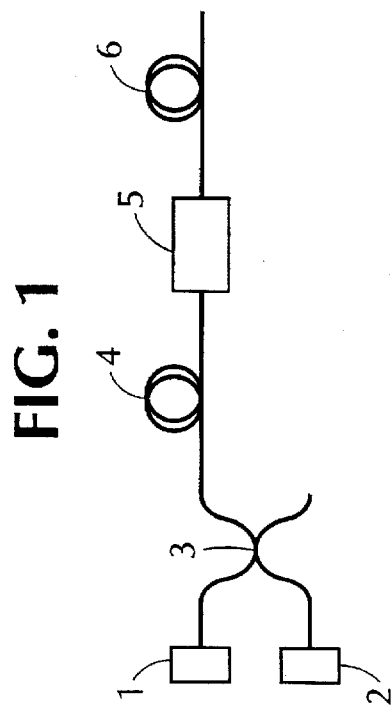
FIG. 10 is the diagram of an alternative filtering element.

In order to further reduce the pump absorption by the filtering element 6, a low-attenuation travel path may be provided for the pump, so as to avoid passage through the true filter. For example, the filtering element may be replaced with a structure as shown in FIG. 10 involving two dichroic couplers 1 and 4 of the same type as those previously described, where the pump radiation passes through the travel path 3 without attenuation, while signals pass through the filter 2.

Alternatively, instead of the Er/Al/Ge/La-doped fibre, a silica-based Er/Al/Ge-doped fibre can be used, with a peak of the spontaneous emission at approximately 1531.5 nm.

While the present invention has been described in connection with a doped optical fibre amplifier, it also applies to amplifiers of different type, using an optical waveguide doped with a rare earth material, preferably erbium.

Figure 11:
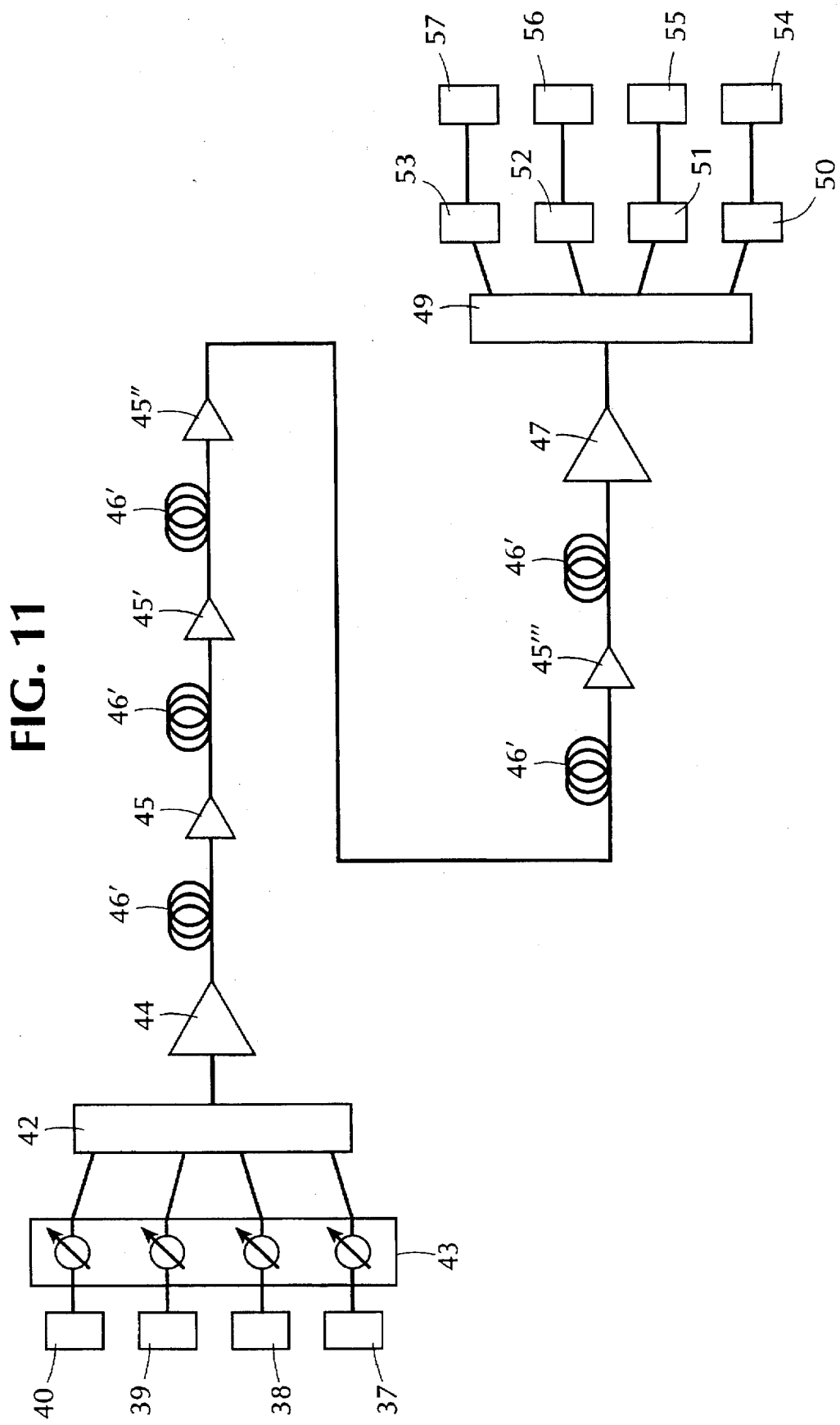
FIG. 11 is the diagram of an optical telecommunication system according to the present invention.

It will be possible to accomplish an optical telecommunication system according to the present invention by utilizing the diagram in FIG. 11. The system uses most of the components employed in the experimental device of FIG. 6, which components have been allocated the same reference number. In place of the variable attenuators 46, portions of passive optical fibre. 46', preferably of the single-mode type, are used end the pre-amplifier 47 consisting of an optical amplifier according to one aspect of the present invention is followed by a demultiplexer 49, a series of four filters 50–53 having a passband centered about each of the signal wavelengths and four receivers, 54–57.

Obviously, the number of the signals simultaneously transmitted is not limited to four, as it only depends on the minimum separation between the wavelengths of adjacent communication channels.

In an optical telecommunication system according to the present invention, as hitherto described, on a transmission line with cascaded amplifiers a spontaneous emission component is present close to the signals at different wavelengths, which is distributed according to a continuous spectrum, typical of the kind of line amplifiers employed along the transmission line.

U.S. Pat. No. 5,283,686 to D. R. Huber discloses, among others, an optical amplifier with a filter for removing undesired spontaneous emission. In an embodiment, which is adapted for use in a wavelength-division multiplexing (WDM) system, the amplifier includes an erbium doped optical fibre, connected to a pump laser by a WDM coupler. The filter includes an optical circulator and Bragg grating reflectors, cascade coupled to one optical circulator port, each reflecting substantially only a narrow band of wavelengths including one of the communication signals. In such a device the signals, first amplified in the doped fibre, are reflected by the grating reflectors and reach the output through the optical circulator, while the undesired spontaneous emission is not reflected by the gratings and exits the device before reaching the output.

U.S. Pat. No. 5,392,153, to J. P. Delavaux, discloses a two stage optical amplifier in which the second stage is pumped with the pump radiation not used in the first stage. In an embodiment a multiplexer demultiplexes the pump and amplified input signal from the first stage and then multiplexes the amplified input signal with the recycled pump to be further amplified by the second stage. The amplifier has means for taking the amplified input signal from said multiplexer and providing an interstage isolator, which may be an optical isolator, an optical fibre splice, loss element or wavelength filter.

According to a further aspect of the present invention, particular types of selective reflection filters allow both introducing a differential attenuation between signals and pump and removing the spontaneous emission at all wavelengths in the band of amplification of an optical amplifier where no communication channels are preset.

According to another aspect, the presence of a further amplification stage allows further compression of the signal dynamics.

Amplifiers of the described type prove to be particularly advantageous in optical networks in which the signals may reach a receiving station after following different paths, that are not predetermined. The power equalizing capability of the amplifier allows in this case to keep constant, along portions of the network, the level of signals that are amplified at the same time, independently from the different paths that the signals may have previously followed.

A two-stage optical line amplifier according to the present invention, adapted for use in an optical wavelength division multiplexing teleccommunication system, will be described with reference to FIG. 12.

In particular, this amplifier provides two stages, differential attenuation means and filtering means being located along the first of the two stages so as to achieve globally the above mentioned gain compression.

The description will reference a line amplifier which is adapted, particularly as to the number of communication signals, for use in an optical telecommunication system of the type of the one described with reference to FIG. 11, instead of line amplifiers 45, 45', 45", 45'". However, the number of the simultaneously amplified signals is not limited to four, as in the description, and is constrained only by the need of keeping the gap between their wavelengths higher than a minimum value, depending on the particular features of the adopted system. In case of need, the line amplifier can be adapted by a person skilled in the art according to specific features of the telecommunication systems where it has to be used.

The first stage of the device will be referred to as 140. In it, a first dichroic coupler 103 feeds the communication signals coming from an input 101 through a first optical isolator 102 and the pumping radiation coming from a first optical pumping source 104 connected to the dichroic coupler 103, to a first section 105 of rare earth doped active optical fibre, whose end connects to a second dichroic coupler 106.

The dichroic coupler 106, like the previous dichroic coupler 103, is of the type adapted for combining into a common output a radiation at the pumping wavelength and a radiation at the wavelength of the communication signals, fed into two different inputs, and respectively adapted for dividing towards two separated outputs the pumping radiation and the communication signals fed into a common input.

One output of the dichroic coupler 106 ends in one input of a dichroic coupler 117 of the same type as the previous ones, so as to establish a low attenuation path for the pumping radiation.

An attenuating and filtering optical circuit 130 is connected between another output of dichroic coupler 106 and another input of dichroic coupler 117. It includes an optical circulator 109, to a first port 107 of which it is connected an output of dichroic coupler 106; an attenuating fibre 110 and selective reflection filters 111, 112, 113, 114, followed by a low-loss termination 115 are cascade coupled to a second port 108 of the same optical circulator. A third port 116 of the optical circulator 109 is connected to the dichroic coupler 117.

The output of this dichroic coupler ends in a second section 118 of rare earth doped active optical fibre, followed by a second optical isolator 119.

The isolator 119 links the first stage of the device to the second stage 150.

The second stage comprises a third section 120 of rare earth doped active optical fibre, a first end of which is fed with the communication signals coming frown the first stage through the isolator 119. The pumping radiation coming from a second pumping source 122 is fed into active fibre section 120 through a fourth dichroic coupler 121, connected to a second end of active fibre section 120, opposite to said first end. The communication signals go, through dichroic coupler 121, to a third optical isolator 123, connected to it, and from there to an output 124.

The active optical fibre is preferentially a silica based optical fibre. The rare earth used as the main dopant is preferably erbium. As the secondary dopants, aluminium, germanium and lanthanum or aluminium and germanium may he advantageously used. As the active fibre a fibre can be used of the type of that shown in the cited patent application U.S. patent application Ser. No. 08/367,719 and previously described.

The corresponding previously described devices can be used also for dichroic couplers 103, 106, 117, 121 and for isolators 102, 119, 123.

Pumping sources 104 and 122 can for example be Quantum Well lasers. In particular, source 104 can be of the type already described with reference to the amplifier of the FIG. 3, while for source 122 a maximum optical output power of about 80 mW at the wavelength of 980 nm is foreseen.

By "filter with selective reflection at the wavelength $\lambda$ of one of the communication signals in a wavelength division multiplexing optical communication system" it is intended an optical component that is capable of reflecting a substantial fraction of the radiation with wavelength in a predetermined wavelength band and of transmitting a substantial fraction of the radiation with wavelength outside said band, wherein said wavelength band includes the wavelength $\lambda$ and excludes the wavelengths of the other communication signals.

The output of selective reflection filter 114 (the one located at the greatest distance from the optical circulator) needs to be conveniently terminated, in order to avoid spurious reflections towards the optical circulator. To this end one of the techniques known to the skilled in the art may be adopted, for example the termination by an angled, low-reflection optical connector 115. A convenient connector is, e.g., model FC/APC, produced by SEIKOH GIKEN, 296-1 Matsuhidai, Matsudo, Chiba (JP).

The optical connections between the various components of the optical circuit of the line amplifier my be carried out by one of the known techniques, e.g. by fusion splicing. The optical connections between selective reflection filters 111, 112, 113, 114 may also be achieved by optical connectors, preferably of the low-reflection type, so as to allow an easy addition or removal of filters with different wavelengths.

Alternatively, it is possible to form all selective reflection filters 111, 112, 113, 114 on a single section of optical fibre, by the techniques described in the following. The optical fibre section is then connected to port 108 of the optical circulator. This alternative has the advantage of not requiring optical connections between the different optical filters, so as to completely remove the relative losses.

The order in which the selective reflection filters 111, 112, 113, 114 are arranged does not constitute a critical aspect of the present invention, in any of the described versions. This order can be modified while carrying out the same.

Optical circulators are passive optical components, commonly with three or four ports in an ordered sequence, transmitting unidirectionally the radiation input in one of the ports towards only one of the remaining ports, namely towards the following one in the sequence. Polarization independent circulators are preferably used. Optical circulators are commercially available components. Adapted for use in the present invention are, for example, model CR1500, produced by JDS FITEL Inc., 570 Heston Drive, Nepeen, Ontario (Calif.) or model PIFC-100 produced by E-TEK DYNAMICS, already cited.

Distributed Bragg reflection optical waveguide filters are an example of selective reflection filters adapted for use in the present invention. They reflect the radiation in a narrow wavelength band and transmit the radiation outside that band. Each of then consists of a section of an optical waveguide, e.g. an optical fibre, along which the refractive index shows periodical variations. If the signal portions reflected at each index change are in phase, constructive interference results and the incident signal is reflected. The condition for constructive interference, corresponding to the maximum reflection, is expressed by the relation $2 \cdot l = \lambda_e/n$, where l indicates the pitch of the grating formed by the refractive index variations, $\lambda_e$ the wavelength of the incident radiation and n the refractive index of the core of the optical waveguide. In the literature the described phenomenon is referred to as distributed Bragg reflection.

The periodical refractive index variation can be achieved by known techniques, for example by exposing a section of an optical fibre, deprived of the protective coating, to the interference fringes formed by a strong UV beam (like the one generated by an excimer laser, a frequency-doubled argon laser or a frequency-quadrupled Nd:YAG laser) put into interference with itself by an appropriate interferometric system, e.g. by a silicon phase mask, as described in U.S. Pat. No. 5,351,321.

The fibre and in particular the core are so exposed to a UV radiation whose intensity varies periodically along the optical axis. In the parts of the core reached by the UV radiation, a partial breakage of the Ge—O bonds takes place, causing a permanent modification in the refractive index.

The central wavelength of the reflected band can be determined at will by choosing the grating pitch so as to verify the constructive interference relation.

By this technique filters can be obtained with a −3 dB band of reflected wavelengths that is typically only between 0.2 and 0.3 nm wide, with reflectivity up to 99% in the center of the band, a central wavelength of the reflected band that can be determined during manufacturing within around±0.1 mn and a central wavelength change with temperature not higher than 0.02 nm/°C.

If the wavelengths of the communication signal sources have a tolerance interval that is wider than between 0.2 and 0.3 nm, filters with a pass—band of corresponding width are needed. For example, the emission wavelength of sources like the semiconductor lasers now commonly used is typically determined within±1 nm, by selection of the produced lasers.

Distributed Bragg reflection optical fibre filters can be manufactured with the required specifications. The width of the reflected band can be made bigger than 0.2+0.3 nm by imposing a chirped pitch to the grating. This is done with known techniques, e.g. from the paper by P. C. Mill et al. published on Electronics Letters, vol. 30, n. 14, Jul. 7, 1994, pages 1172–1174.

Figure 12:
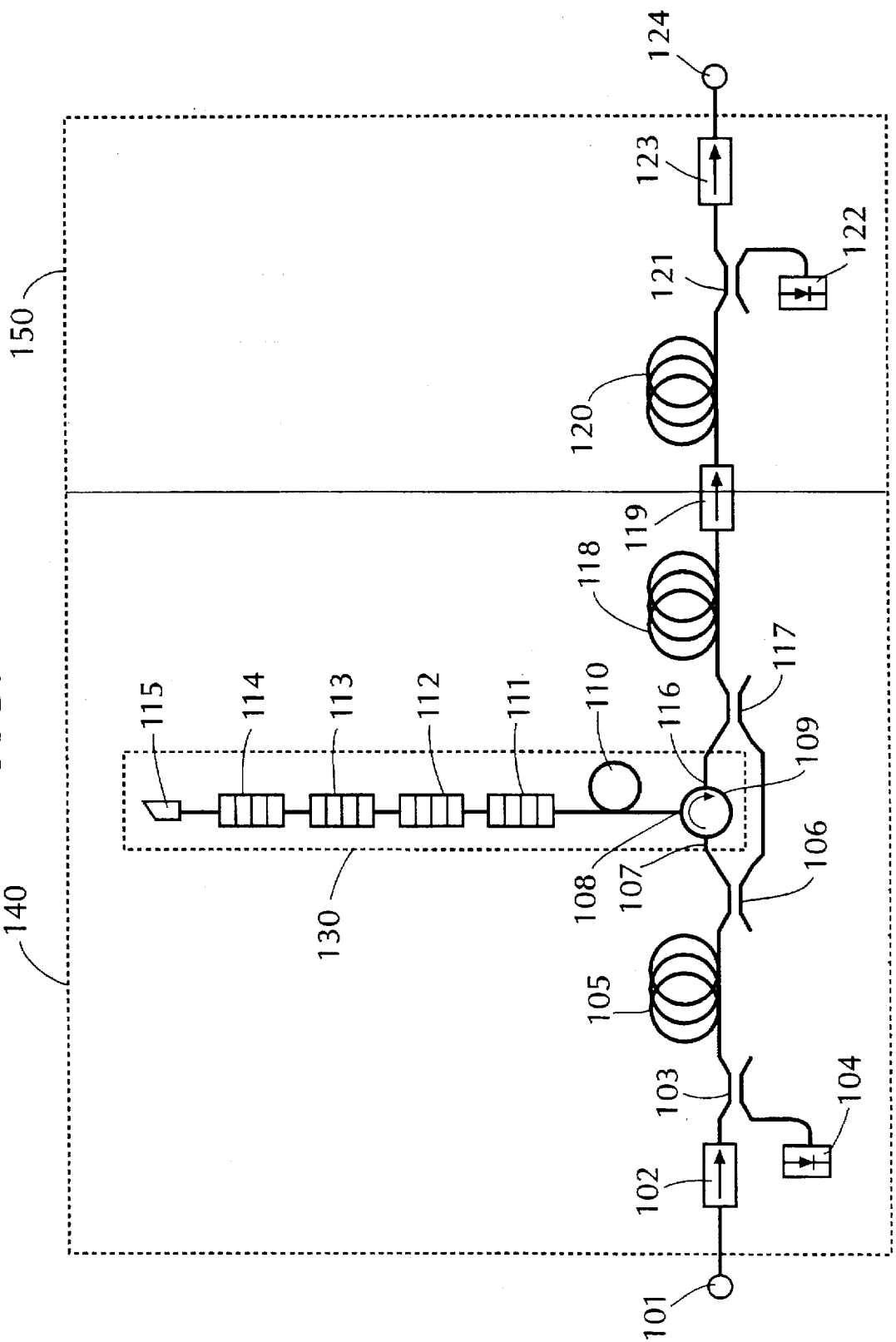
FIG. 12 shows a diagram of a two-stage optical line amplifier according to an embodiment of the present invention.

If the operating conditions on an optical communication line, along which the amplifier of the FIG. 12 is used, require compensation of the chromatic dispersion at the communication signal wavelengths, distributed Bragg reflection optical fibre filters with chirped gratings, manufactured with the specifications known, e.g., from the paper by F. Ouellette published on Optics Letters, Vol. 12, n. 10, pages 847–849, October 1987, can be used as selective reflection filters 111, 112, 113, 114.

If it is foreseen to use the line amplifier under conditions of significant temperature variations, it may be appropriate to thermally stabilise optical fibre filters 111, 112, 113, 114.

The attenuating fibre 110 is manufactured to attenuate the communication signals of a given amount. Conveniently the attenuation provided by the same may be half of the attenuation needed for the signals, because of the double passage through fibre 110.

Along the optical path between the end of the first active fibre section 105 and the beginning of the second active fibre section 118, the attenuation suffered by the communication signals (through dichroic coupler 106, optical circuit 130 and dichroic coupler 117) is preferably higher by 5 dB±1 dB than the attenuation suffered by the pumping radiation (through dichroic couplers 106 and 117).

In addition to using an attenuating fibre 110, e.g. of the type described with reference to the FIG. 12, a localized attenuation at the signal wavelengths may be achieved by other known techniques: for example, by putting between port 108 of the optical circulator and selective reflection filter 111 a fusion splice, carried out so as to provide a given loss. It is known how to carry out attenuating fusion splices between the ends of two optical fibres, aligned with their respective optical axes a small distance apart, depending on the desired loss.

A localized attenuation for the communication signals may be achieved also by using components with limited reflectivity at the signal wavelength as selective reflection filters 111, 112, 113, 114. Distributed Bragg reflection optical fibre filters can be manufactured e.g. with a reflectivity lower than the cited maxima.

The described line amplifier has a two stage structure.

The first stage 140 consists of two optical fibre sections, divided by dichroic couplers 106, 117 and by optical circuit 130. It removes the spontaneous emission and compresses the signal dynamics. A variation not higher than about 6 dB in the power of one of the communication signals at the output of the first stage has been evaluated in the case of a change of 20 dB in the input power of the signal.

The second stage 150 amplifies the signals to a sufficient power for transmission through the passive fibre following the amplifier. Thanks to the high degree of saturation of the active fibre 120, the second stage further contributes to compress the signal dynamics. The Applicant has measured, in an amplification stage with the specifications of the second stage 150, a variation in the output power not higher than 0.1 dB for each dB of change in the input power of the second stage, for any commnication signal. The Applicant reckons that in a general case this variation is lower than 0.2 dB/dB.

The isolators 102, 119 and 123, set at the input and at the output of the two stages, reduce noise, particularly that due to counter-propagating spontaneous emission, to Rayleigh and Brillouin scattering and to the relative reflections along the communication line.

The optical circuit 130 filters the communication signals with respect to the spontaneous emission and, at the same time, selectively attenuates the communication signals with respect to the pump.

The selective attenuation causes, in accordance with the previously explained mechanism, a differential absorption of the pump in the two active fibre sections of the first stage of the described amplifier, in case of strong or weak input signals, from which a compression of the signal dynamics derives.

The presence of amplified spontaneous emission with wavelengths different from the communication signals has already been mentioned as a cause of low compression of the signal dynamics, even in the case of differential attenuation of the signals with respect to the pump.

In the just described line amplifier, this problem is solved by combining the operation of signal/pump differential attenuation with the operation of removing the spontaneous emission at the wavelengths different from those of the communication signals, both operations being performed by optical circuit 130 together with dichroic couplers 106 and 117.

In the described line amplifier, the spontaneous emission generated in the first section of active fibre and propagating in the signal direction is removed and does not propagate to the second section of active fibre.

Spontaneous emission is generated also along the second section 118 of active fibre of the first stage and along the active 120 of the second stage.

However, if more amplifiers of the type of the one described are cascade connected along a communication line, each of them receives as an input, in addition to the communication signals, only the spontaneous emission component generated in the previous line amplifier. The spontaneous emission accumulating along the line is limited. In particular, the power of the spontaneous emission with frequency ν present along the line after $N_A$ amplifiers, is expressed by the following formula $$P_{ASE}=2h\nu n_{sp} \Delta\nu(G-1)N_A,$$

where h is the Planck constant, $n_{sp}$ is the inversion level of the active fibre, G is the overall gain of the active fibre and Δν is the overall bandwidth of the filtering means, that is, in the case of the invention, the sum of the bandwidths of the selective reflection filters associated with each communication signal.

Each of the line amplifiers according to the present invention compresses effectively the signal dynamics by the described mechanism, in the absence of spontaneous emission at its input with sufficient intensity to hinder the pump differential absorption in the two active fibre sections of the first stage.

The position of the optical circuit 130 with respect to the two active fibre sections of the first stage of the line amplifier can he chosen following the same criteria described in the cited patent application EP567941 to position the filtering means, and in particular between 50% and 75% of the overall length of the active fibre.

A person skilled in the art, in the presence of specific features of the employed system and devices will be able to select the most appropriate locations, case by case, in order to accomplish the operating mechanism of the invention, as described.

Figure 13:
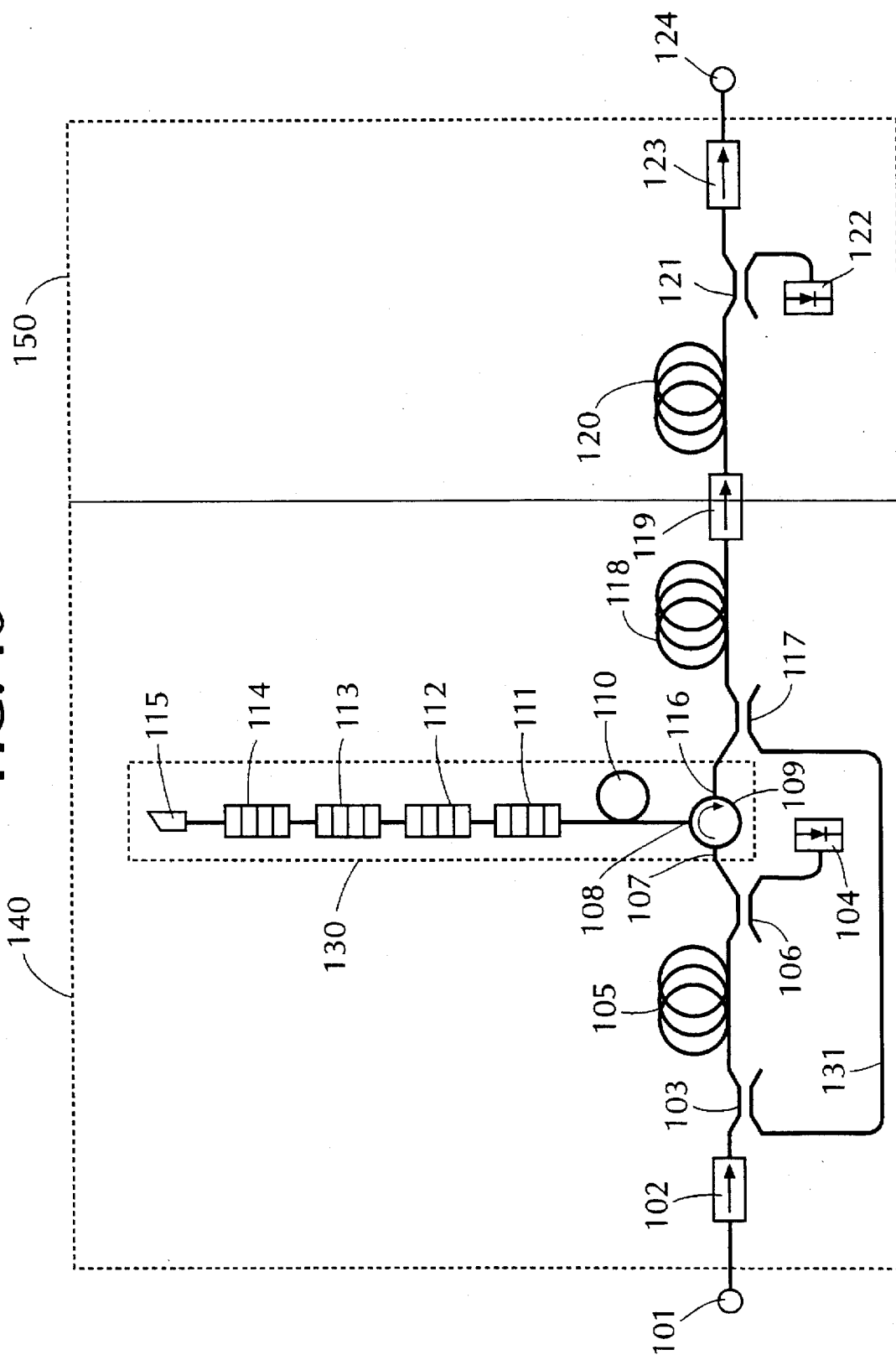
FIG. 13 shows a diagram of a two-stage optical line amplifier according to a different embodiment of the present invention.

FIG. 13 shows the diagram of a two stage line amplifier according to an alternative version of the present invention. Components corresponding to the ones of the FIG. 12 have been allocated the same reference number. For their description reference is made to the previous description.

In the line amplifier shown in the FIG. 13 the first active fibre section 105 of the first stage 140 is pumped, in a direction opposite to signal propagation, by radiation from the pumping source 104, connected to an end of active fibre 105 by the dichroic coupler 106.

The dichroic coupler 103, connected to the opposite end of active fibre section 105, leads the residual pumping radiation to an end of an optical fibre 131, connected by its other end to dichroic coupler 117, so as to feed said residual pumping radiation in the second active fibre section 118; whereas the communication signals follow the same path as in the line amplifier of the FIG. 12.

In the two stage line amplifier according to the alternative version of the present invention, described with reference to the FIG. 13, the residual pump power from the first active fibre section 105, available for pumping the second active fibre section 118, is slightly higher, according to the evaluation of the Applicant, than in the line amplifier described with reference to the FIG. 12. Absorption of the counter-propagating pump along the first active fibre section causes an excitation level for the dopant in the fibre increasing in the signal propagation direction, the opposite of what happened in the first active fibre section of the amplifier of the FIG. 12. Therefore, at the beginning of the first active fibre section, the low signal is amplified less in comparison to the case of co-propagating pump. The signal reaches with a lower amplification the end part of the first active fibre section 105, and exploits to a lesser extent the pumping radiation. Then the residual pump radiation available for the second active fibre section is greater. For these reasons, a slightly higher gain compression is expected.

We claim:

1. An optical telecommunication system comprising:

a transmitting means for supplying at least two optical signals having different wavelengths in a signal band of a predetermined bandwidth;

a receiving means;

an optical fiber line coupled to said transmitting means and interposed between the transmitting means and the receiving means for transmitting said optical signals from said transmitting means toward said receiving means, said line comprising:

at least one active-waveguide optical amplifying means disposed along and connected to the line and spontaneous signal emission in a wavelength band contiguous to said signal band arising in said line; and an optical pre-amplifier intermediate, and coupled to, said line and said receiving means, said optical pre-amplifier comprising:

a doped optical waveguide doped with rare earth material and having first and second amplification stages for amplifying optical signals, the first amplification stage being coupled to the second amplification stage;

a means for coupling the at least two optical signals from said line to the first amplification stage;

a source of pumping energy at a pumping wavelength outside said signal band;

a means for coupling said source of pumping energy to said first amplification stage;

a differential-attenuation means located at a first predetermined position along said doped optical waveguide between the first and second amplification stages, wherein said differential-attenuation means attenuates signals in said signal band by a predetermined amount greater than the amount by which said pumping energy is attenuated;

a filtering means located at a second predetermined position, different from said first predetermined position, along said doped optical waveguide between the first and second amplification stages, wherein said filtering means attenuates the spontaneous emission signals in said band contiguous to the signal band by an amount greater than the amount by which signals in said signal band are attenuated, the amount by which said filtering means attenuates spontaneous signals being greater than a predetermined minimum and wherein said predetermined amount of attenuation by said differential-attenuation means, said predetermined minimum of the attenuation of said spontaneous signals by the filtering means and the first and second predetermined positions and said wavelength band contiguous to said signal band are selected so that variation in the range of power levels of the amplified optical signals at the output of the second amplification stage and supplied to the receiving means is not greater than 12 dB when the range of power levels of one of the signals coupled to said first amplification stage is 20 dB.

2. The system of claim 1, wherein the wavelength band contiguous to said signal band includes the wavelength of the maximum spontaneous emission generated by the pre-amplifier.

3. The system of claim 1, wherein the bandwidth continuous to the predetermined bandwidth includes the wavelength of the maximum spontaneous emission generated by at least one said amplification stage.

4. The system of claim 1, wherein when one of the optical signals supplied to the pre-amplifier has power levels within a range of not greater than 20 dB, the power level of the amplified optical signal at the output of the second amplification stage and supplied to the receiving means has a power level within a range of not greater than 9 dB.

5. The system of claim 1, wherein when one of the optical signals supplied to the pre-amplifier has power levels within a range of not greater than 20 dB, the power level of the amplified optical signal at the output of the second amplification stage and supplied to the receiving means has a power level within a range of not greater than 6 dB.

6. The system of claim 1, wherein the second predetermined position is at between 15% and 50% of the length of the doped optical waveguide from the input of said first amplification stage.

7. The system of claim 6, wherein the second predetermined position is at between 20% and 30% of the length of the doped optical waveguide from the input of said first amplification stage.

8. The system of claim 1, wherein the first predetermined position is at between 50% and 75% of the length of the doped optical waveguide from the input of said first amplification stage.

9. The system of claim 1 further comprising:
a second filtering means disposed along the doped optical waveguide wherein the second filtering means attenuates the spontaneous signal emission at at least one wavelength in said wavelength band contiguous to said signal band by an amount greater than the amount which it attenuates signals in said signal band.

10. The system of claim 9, wherein the second filtering means is located at a position between 50% and 75% of the length of the waveguide from the input of said first amplification stage.

11. The system of claim 1, wherein said doped optical waveguide is a silica-based optical fiber co-doped with a rare earth material.

12. The system of claim 11, wherein the rare earth material is erbium.

13. The system of claim 12, wherein the optical fiber is further doped with an element selected from the group consisting of aluminum, germanium and lanthanum and combinations thereof.

14. The system of claim 12, wherein the optical fiber is further doped with aluminum and germanium.

15. The system of claim 12, wherein the filtering means has a −3 dB cut-off wavelength between 1532 and 1534 nm.

16. The system of claim 12, wherein the predetermined bandwidth of said signal band is from 1535 to 1560 nm.

17. The system of claim 1, wherein the filtering means comprises a portion of optical fiber, wherein the portion of optical fiber includes first and second cores optically coupled to each other for attenuating wavelengths in said band contiguous to the signal band, wherein said doped optical waveguide includes a doped fiber and the first core is coaxial with the doped optical fiber and has first and second ends which are each connected to the doped optical fiber, and wherein the second core is off-center with respect to the doped optical fiber and has first and second ends which are without connection to the doped optical fiber.

18. The system of claim 1, wherein the filtering means includes a reflecting interference filter.

19. The system of claim 1, wherein the filtering means comprises:
a first dichroic coupler coupling signals in said signal band and spontaneous emission signals in said contiguous wavelength band to a first terminal and separating pumping energy from the signals in said signal band and signals in said continuous wavelength band and supplying the pumping energy to a second terminal;
a filter coupled to the first terminal, wherein the filter attenuates the spontaneous emission signals more than said signals in said signal band; and
a second dichroic coupler for combining signals attenuated by the filter with radiation coupled to the second terminal.

20. The system of claim 1, wherein the attenuation of said signals in said wavelength band contiguous to said signal band is at least 6 dB.

21. The system of claim 20, wherein attenuation of said signals in said wavelength band contiguous to said signal band is at least 10 dB.

22. The system of claim 1, wherein the differential-attenuation means comprises:
a first dichroic coupler coupling radiation in said signal band and energy at the pumping wavelength to a first terminal and a second terminal, respectively;
an attenuating component coupled to the first terminal, wherein the attenuating component attenuates signals in said signal band; and
a second dichroic coupler combining signals attenuated by the attenuating component with pumping energy coupled to the second terminal.

23. The system of claim 22, wherein the attenuating component is an optical fiber.

24. The system of claim 22 further comprising:
an optical isolator coupled to and inserted between the attenuating component and the second dichroic coupler.

25. The system of claim 1, wherein the differential-attenuation means comprises a winding of an optical fiber, the radius of the winding being selected to attenuate signals in said signal band more than said pumping energy.

26. The system of claim 25, wherein said optical fiber is a portion of the doped optical fiber.

27. The system of claim 1, wherein the amount of attenuation of signals in said signal band exceeds the attenuation of said pumping energy by 5±1 dB.

28. The system of claim 1, wherein the optical amplifying means comprises at least three cascaded active-fiber optical amplifiers.

29. The system of claim 28, wherein the optical amplifying means comprises a silica-based active fiber having a core doped with at least one fluorescent dopant as the main dopant and at least one secondary dopant, the relationship of the main dopant to the secondary dopant being such that an optical signal/noise ratio for the amplified optical signals supplied to the receiving means, as measured with a filtering means having a band width of 0.5 nm, is at least 15 dB when the power levels of the optical signals supplied to each of the active fiber optical amplifiers is at least −16 dBm.

30. The system of claim 29, wherein the main dopant is erbium and the secondary dopants are one or more of aluminum, germanium and lanthanum.

31. An optical amplifier comprising:
at least one active-waveguide optical amplifying means for receiving signals in a signal band from an optical fiber line and connected to the optical fiber line and spontaneous signal emission in a wavelength band contiguous to said signal band arising in said line; and comprising:
a doped optical waveguide doped with rare earth material and having first and second amplification stages for amplifying optical signals, the first amplification stage being coupled to the second amplification stage;
a means for coupling the at least two optical signals from said line to the first amplification stage;
a source of pumping energy at a pumping wavelength outside said signal band;
a means for coupling said source of pumping energy to said first amplification stage;
a differential-attenuation means located at a first predetermined position along said doped optical waveguide between the first and second amplification stages, wherein said differential-attenuation means attenuates signals in said signal band by a predetermined amount greater than the amount by which said pumping energy is attenuated;
a filtering means located at a second predetermined position, different from said first predetermined position, along said doped optical waveguide between the first and second amplification stages, wherein said filtering means attenuates spontaneous emission signals in said band contiguous to the signal band by an amount greater than the amount by which signals in said signal band are attenuated, the amount by which said filtering means attenuates spontaneous signals being greater than a predetermined minimum and wherein said predetermined amount of attenuation by said differential-attenuation means, said predetermined minimum of the attenuation of said spontaneous signals by the filtering means and the first and second predetermined positions and said wavelength band contiguous to said signal band are selected so that variation in the range of power levels of the amplified optical signals at the output of the second amplification stage is not greater than 12 dB when the range of power levels of one of the signals coupled to said first amplification stage is 20 dB.

32. The optical amplifier of claim 31, wherein the wavelength band contiguous to said signal band includes the wavelength of the maximum spontaneous emission generated by the pre-amplifier.

33. The optical amplifier of claim 31, wherein when one of the optical signals supplied to the pre-amplifier has power levels within a range of not greater than 20 dB, the power level of the amplified optical signal at the output of the second amplification stage has a power level within a range of no greater than 9 dB.

34. The optical amplifier of claim 31, wherein when one of the optical signals supplied to the pre-amplifier has power levels within a range of not greater than 20 dB, the power level of the amplified optical signal at the output of the second amplification stage has a power level within a range of no greater than 6 dB.

35. The optical amplifier of claim 31, wherein the second predetermined position is at between 15% and 50% of the length of the doped optical waveguide from the input of said first amplification stage.

36. The optical amplifier of claim 35, wherein the second predetermined position is at between 20% and 30% of the length of the doped optical waveguide from the input of said first amplification stage.

37. The optical amplifier of claim 31, wherein the first predetermined position is at between 50% and 75% of the length of the doped optical waveguide from the input of said first amplification stage.

38. The optical amplifier of claim 31 further comprising:
a second filtering means disposed along the doped optical waveguide wherein the second filtering means attenuates the spontaneous signal emission at at least one wavelength in
said wavelength band relative to signals in said signal band by an amount greater than the amount which it attenuates signals in said signal band.

39. The optical amplifier of claim 38, wherein the second filtering means is located at a position between 50% and 75% of the length of the waveguide from the input of said first amplification stage.

40. The optical amplifier of claim 31, wherein said doped optical waveguide is a silica-based optical fiber co-doped with a rare earth material.

41. The optical amplifier of claim 40, wherein the rare earth material is erbium.

42. The optical amplifier of claim 41, wherein the optical fiber is further doped with an element selected from the group consisting of aluminum, germanium and lanthanum and combinations thereof.

43. The optical amplifier of claim 41, wherein the optical fiber is further doped with aluminum and germanium.

44. The optical amplifier of claim 41, wherein the filtering means has a bandwidth with a −3 dB cut-off wavelength between 1532 and 1534 nm.

45. The optical amplifier of claim 44, wherein the predetermined bandwidth of said signal band is from 1535 to 1560 nm.

46. The optical amplifier of claim 31, wherein the filtering means comprises a portion of optical fiber, wherein the portion of optical fiber includes first and second cores optically coupled to each other for attenuating wavelengths in said band contiguous to the signal band, wherein said doped optical waveguide includes a doped fiber and the first core is coaxial with the doped optical fiber and has first and second ends which are each connected to the doped optical fiber, and wherein the second core is off-center with respect to the doped optical fiber and has first and second ends which are without connection to the doped optical fiber.

47. The optical amplifier of claim 31, wherein the filtering means includes a reflecting interference filter.

48. The optical amplifier of claim 31, wherein the filtering means comprises:
a first dichroic coupler coupling signals in said signal band and spontaneous emission signals in said contiguous wavelength band to a first terminal and separating pumping energy from the signals in said signal band and signals in said contiguous wavelength band and supplying the pumping energy to a second terminal;

a filter coupled to the first terminal, wherein the filter attenuates the spontaneous emission signals more than said signals in said signal band; and a second dichroic coupler for combining signals attenuated by the filter with signals coupled to the second terminal.

49. The optical amplifier of claim 31, wherein the attenuation of said signals in said wavelength band contiguous to said signal band is at least 6 dB.

50. The optical amplifier of claim 49, wherein the attenuation of said signals in said wavelength band contiguous to said signal band is at least 10 dB.

51. The optical amplifier of claim 31, wherein the differential-attenuation means comprises:

a first dichroic coupler coupling radiation in said signal band and energy at the pumping wavelength to a first terminal and a second terminal, respectively;

an attenuating component coupled to the first terminal, wherein the attenuating component attenuates signals in said signal band; and a second dichroic coupler combining signals attenuated by the attenuating component with pumping energy coupled to the second terminal.

52. The optical amplifier of claim 50, wherein the attenuating component is an optical fiber.

53. The optical amplifier of claim 50 further comprising:

an optical isolator coupled to and inserted between the attenuating component and the second dichroic coupler.

54. The optical amplifier of claim 31, wherein the differential-attenuation means comprises a winding of an optical fiber, the radius of the winding being selected to attenuate signals in said signal band more than said pumping energy.

55. The optical amplifier of claim 54, wherein said optical fiber is a portion of the doped optical fiber.

56. The optical amplifier of claim 31, wherein the amount of attenuation of signals in said signal band exceeds the attenuation of said pumping energy by 5±1 dB.

57. An optical telecommunication system comprising:

a transmitting means for supplying at least two optical signals having different wavelengths in a signal band of a predetermined bandwidth;

a receiving means;

an optical fiber line coupled to and interposed between the transmitting means and the receiving means for coupling said transmitting means to said receiving means;

a first active-waveguide optical amplifier disposed in said line and comprising:

a first doped optical waveguide doped with a rare earth material and having first and second amplifying portions for amplifying optical signals;

a first source of pumping energy at a wavelength outside said signal band;

a first means for coupling the at least two optical signals from the line to said first doped optical waveguide and for coupling said source of pumping energy to said first amplifying portion;

differential-attenuation means and filtering means interconnecting said first and second portions, said differential-attenuation means attenuating signals in the signal band by an amount greater than the amount of attenuation of said pumping energy by a predetermined amount; and said filtering means transmitting without substantial attenuation signals in said signal band at a plurality of signal wavelengths spaced from each other and for attenuating spontaneous emission signals at wavelengths different from said plurality of signal wavelengths by more than a predetermined minimum; and a second active-waveguide optical amplifier coupled to said second portion of said first doped optical waveguide for receiving signals in said signal band from said second portion, the second amplifier comprising:

a second doped optical waveguide doped with rare earth material coupled to said second portion of said first doped optical waveguide;

a second source of pumping energy at a wavelength outside said signal band coupled to said second doped optical waveguide;

wherein the lengths of said portions of said first doped optical waveguide, said predetermined amount of attenuation by said differential-attenuation means, and said predetermined minimum of attenuation by said filtering means are selected such that a power variation of a signal in said power band supplied to the input of said first doped optical waveguide within a range of 20 dB cause output power variations at the input of said second doped optical waveguide not greater than 12 dB.

58. The system of claim 57, wherein the operating parameters of said second active-waveguide optical amplifier are selected so that the variation of signal output power of said second amplifier is not greater than 0.3 dB for each 1 dB of variation in the signal power supplied to the input of said second amplifier.

59. The system of claim 57, wherein the signal output power variation is not greater than 0.2 dB for each 1 dB of variation of the input power.

60. The system of claim 57, wherein said predetermined amount of attenuation of said differential-attenuation means is higher than 5 dB±1 dB.

61. The system of claim 57, wherein the filtering means includes a distributed Bragg reflection filter.

62. In a wavelength-division multiplexing optical communication system in which a plurality of communication signals at different wavelengths in a signal band are transmitted over a single optical fiber line including optical amplifiers in series with an optical fiber, at least one of the amplifiers having a doped active fiber which is pumped with pumping energy at a wavelength outside said band and undesirable spontaneous emission signals also being produced along the line, the method of increasing the amplification of a communication signal which is small relative to other communication signals and causing the variation of the power level of the output signals of the line in the signal band to be limited to 12 dB when the variations in the power levels of the signal input to the line are 20 dB, said method comprising:

at a position intermediate the ends of said doped active fiber, filtering out, and hence, attenuating at least a portion of the spontaneous emission signals at at least one wavelength different from the wavelengths of said communication signals by an amount greater than the amount of attenuation of the communication signals; and at a position intermediate the ends of said doped active fiber, attenuating said communication signals with respect to said pumping energy by at least a predetermined amount wherein the position of the filtering, the position of the attenuating of the communication signals relative to the pumping energy and said predetermined amount are selected so that when the power variations of the communication signal supplied to said one of said amplifiers are within a range of 20 dB, the output power variations of the communication signals are not greater than 12 dB.

63. The method of claim 62, wherein the position of the filtering and the position at which the communication signals are attenuated relative to the pumping energy are the same.

64. The method of claim 62, wherein the wavelengths of at least two of said communication signals are spaced from each other to provide an intermediate band of wavelengths and spontaneous emission signals in said intermediate band are filtered and attenuated.

65. An optical amplifier comprising:
- an optical waveguide doped with rare earth material having first and second amplification stages for amplifying optical signals, wherein the first stage is coupled to the second stage;
- a means for coupling at least two optical radiation signals having different wavelengths in a predetermined bandwidth to the first amplification stage;
- a means for coupling pumping energy at a pumping wavelength to the first amplification stage; and
- an optical attenuation means located along the waveguide between the first and second amplification stages for attenuating energy in the predetermined bandwidth substantially more than the pumping radiation at the pumping wavelength and attenuating spontaneous emission radiation in a bandwidth contiguous to the predetermined bandwidth substantially more than the amount by which radiation in the predetermined bandwidth is attenuated such that propagation of spontaneous radiation from the first stage to the second stage is avoided and variation in the range of power levels of the amplified optical signals generated at the second amplification stage is minimized.

66. An optical telecommunication system comprising:
- a transmitting means for supplying at least two optical signals having different wavelengths in a predetermined bandwidth;
- a receiving means; and
- an optical amplifier coupled to and interposed between the transmitting means and the receiving means, the optical amplifier comprising:
  first and second amplifying stages;
  a means for coupling the at least two optical radiation signals to the first amplification stage;
  a means for coupling pumping radiation at a pumping wavelength to the first amplification stage; and
  an optical attenuation means located along the waveguide between the first and second amplification stages for attenuating radiation at the pumping wavelength with a first attenuation, radiation in the predetermined bandwidth with a second attenuation and spontaneous emission radiation in a bandwidth contiguous to the predetermined bandwidth with a third attenuation, wherein the second attenuation substantially exceeds the first attenuation and the third attenuation is sufficient to avoid propagation of spontaneous radiation from the first stage to the second stage such that variation in the range of power levels of the amplified optical signals generated at the second amplification stage is minimized.

67. A method for amplifying optical signals comprising:
supplying at least two optical radiation signals having different wavelengths in a predetermined bandwidth to a first amplification stage of an optical waveguide doped with rare earth material;

supplying pumping radiation at a pumping wavelength to first stage;

amplifying the optical signals at the first stage, spontaneous emission optical signals being generated during amplification of the optical signals at the first stage;

transmitting the optical signals from the first stage to a second amplification stage of the waveguide, wherein the second stage is coupled in cascade to the first stage and amplifies the optical signals from the first stage; and attenuating during the transmission of the radiation from the first to the second stage radiation at the pumping wavelength with a first attenuation, radiation in the predetermined bandwidth with a second attenuation and the spontaneous emission radiation in a bandwidth contiguous to the predetermined bandwidth with a third attenuation, wherein the second attenuation substantially exceeds the first attenuation and the third attenuation is sufficient to avoid propagation of the spontaneous radiation from the first stage to the second stage, wherein values of the first, second and third attenuations and a position between the first and second stages where the transmitted radiation is attenuated are selected such that variation in the range of power levels of the amplified optical signals generated at the second amplification stage is minimized.

* * * * *

UNITED STATES PATENT AND TRADEMARK OFFICE
CERTIFICATE OF CORRECTION

PATENT NO. : 5,701,194
DATED : December 23, 1997
INVENTOR(S) : Meli et al

It is certified that error appears in the above-indentified patent and that said Letters Patent is hereby corrected as shown below:

Col. 1, line 16, after "transmission"." (1st. occ.) a new line should be inserted reading as follows: --Background of the Invention--;

line 65, change "red" to --fed--;

Col. 2, line 40, after "application" insert --which--;

Col. 4, line 36, change "of" (1st. occ.) to --at--;

Col. 5, line 16, change "or" to --of--;

line 54, change "continuous" to --contiguous--;

Col. 6, line 15, change "continuous" to --contiguous--;

Col. 7, line 4, change "optical/amplifiers" to --optical amplifiers--; cancel "amplifiers" (second occurrence);

Col. 9, line 46, change "alone" to --along--;

line 56, change "alone" to --along--;

Col. 10, line 21, change "cove" to --core--;

UNITED STATES PATENT AND TRADEMARK OFFICE
CERTIFICATE OF CORRECTION

Page 2 of 3

PATENT NO. : 5,701,194
DATED : December 23, 1997
INVENTOR(S) : Meli et al

It is certified that error appears in the above-indentified patent and that said Letters Patent is hereby corrected as shown below:

Col. 11, line 28, change "(Calif.)" to --CA--;

Col. 14, line 67, change "preset" to --present--;

Col. 15, line 14, change "teleccommunication" to --telecommunication--;

Col. 16, line 47, change "my" to --may--;

Col. 17, line 6, change "(Calif.)" to --CA--;

line 12, change "then" to --them--;

line 46, "mn" should read --nm--;

line 57, change "bigger than 0.2+0.3" to --bigger than between 0.2 and 0.3--;

Col. 18, line 6, change "stabilise" to --stabilize--;

line 8, change "of" to --by-- line 21, change "techniques:" to --techniques,--;

UNITED STATES PATENT AND TRADEMARK OFFICE
CERTIFICATE OF CORRECTION

PATENT NO. : 5,701,194
DATED : December 23, 1997
INVENTOR(S) : Meli et al

It is certified that error appears in the above-indentified patent and that said Letters Patent is hereby corrected as shown below:

Col. 21, lines 18 and 19, change "continuous" to --contiguous--;

Col. 22, 24, change "continuous" to --contiguous--.

Signed and Sealed this

Nineteenth Day of May, 1998

Attest:

Attesting Officer

BRUCE LEHMAN

Commissioner of Patents and Trademarks